US010778977B2

(12) United States Patent
Wang et al.

(10) Patent No.: US 10,778,977 B2
(45) Date of Patent: Sep. 15, 2020

(54) TRIANGLE MOTION INFORMATION FOR VIDEO CODING

(71) Applicant: QUALCOMM Incorporated, San Diego, CA (US)

(72) Inventors: Hongtao Wang, San Diego, CA (US); Yung-Hsuan Chao, San Diego, CA (US); Han Huang, San Diego, CA (US); Vadim Seregin, San Diego, CA (US); Wei-Jung Chien, San Diego, CA (US); Marta Karczewicz, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 16/703,495

(22) Filed: Dec. 4, 2019

(65) Prior Publication Data

US 2020/0186799 A1 Jun. 11, 2020

Related U.S. Application Data

(60) Provisional application No. 62/775,802, filed on Dec. 5, 2018.

(51) Int. Cl.
*H04N 19/00* (2014.01)
*H04N 19/119* (2014.01)
(Continued)

(52) U.S. Cl.
CPC ......... *H04N 19/119* (2014.11); *H04N 19/115* (2014.11); *H04N 19/176* (2014.11); *H04N 19/51* (2014.11); *H04N 19/70* (2014.11)

(58) Field of Classification Search
CPC .. H04N 19/119; H04N 19/115; H04N 19/176; H04N 19/51; H04N 19/70
See application file for complete search history.

(56) References Cited

U.S. PATENT DOCUMENTS

| 2019/0104303 A1 | 4/2019 | Xiu et al. |
| 2019/0230285 A1 | 7/2019 | Kim |

(Continued)

FOREIGN PATENT DOCUMENTS

| EP | 0543915 A1 | 6/1993 |
| WO | 2019039322 A1 | 2/2019 |

OTHER PUBLICATIONS

Bross B., et al., "Versatile Video Coding (Draft 6)", Joint Video Experts Team (JVET) of ITU-T SG 16 WP 3 and ISO/IEC JTC 1/SC 29/WG 11, JVET-O2001-vE, Jul. 3-12, 2019, 455 pages.

(Continued)

*Primary Examiner* — Zhihan Zhou
(74) *Attorney, Agent, or Firm* — Shumaker & Sieffert, P.A.

(57) ABSTRACT

This disclosure describes determining triangular prediction blocks for a current block partitioned in a triangle mode. A video coder may determine indices in a motion vector predictor list to identify motion vector predictors used to determine the triangular prediction block. If a first index value in the motion vector predictor list for a first triangular prediction block is less than a second index value in the motion vector predictor list for a second triangular prediction block, the signaled or received value for the second triangular prediction block may be the second index value reduced by an offset.

25 Claims, 9 Drawing Sheets

(51) Int. Cl.
*H04N 19/115* (2014.01)
*H04N 19/51* (2014.01)
*H04N 19/70* (2014.01)
*H04N 19/176* (2014.01)

(56) References Cited

U.S. PATENT DOCUMENTS

| | | | |
|---|---|---|---|
| 2019/0273921 A1 | 9/2019 | Abe et al. | |
| 2019/0281290 A1 | 9/2019 | Lee et al. | |
| 2019/0379901 A1* | 12/2019 | Chiang | H04N 19/176 |
| 2020/0021845 A1* | 1/2020 | Lin | H04N 19/167 |
| 2020/0029087 A1* | 1/2020 | Lim | H04N 19/52 |
| 2020/0120334 A1* | 4/2020 | Xu | H04N 19/176 |
| 2020/0128266 A1* | 4/2020 | Xu | H04N 19/132 |

OTHER PUBLICATIONS

Chen J., et al., "Algorithm Description of Joint Exploration Test Model 1," 1, JVET Meeting; Oct. 19, 2015-Oct. 21, 2015; Geneva;(The Joint Video Exploration Team of ISO/IEC JTC1/SC29/WG11 and ITU-T SG.16 ); URL: http://phenix.int-evry.fr/jvet/,, No. JVET-A1001 Feb. 24, 2016 (Feb. 24, 2016), XP030150000, 27 pages.

Ergen S., "ZigBee/IEEE 802.15.4 Summary", Sep. 10, 2004, 37 Pages.

Gao H., et al., "CE4: CE4-1.1, CE4-1.2 and CE4-1.14: Geometric Merge Mode (GEO)", 16th Meeting: Geneva, CH, Oct. 1-11, 2019, (The Joint Video Exploration Team of ISO/IEC JTC1/SC29/WG11 and ITU-T SG.16), No. JVET-P0068-V1, pp. 1-6.

IEEE Std 802.11ad-2012: "Part 11: Wireless LAN Medium Access Control (MAC) and Physical Layer (PHY) Specifications—Amendment 3: Enhancements for Very High Throughput in the 60 GHz Band", LAN/MAN Standards Committee of the IEEE Computer Society, Dec. 28, 2012, 628 Pages.

International Search Report and Written Opinion—PCT/US2019/064698—ISA/EPO—Feb. 19, 2020 (15 pp).

ITU-T H.265, "Series H: Audiovisual and Multimedia Systems, Infrastructure of audiovisual services—Coding of moving video, High efficiency video coding," The International Telecommunication Union. Dec. 2016, 664 Pages.

ITU-T H.265, Series H: Audiovisual and Multimedia Systems, Infrastructure of Audiovisual Services—Coding of Moving video, High Efficiency Video Coding, The International Telecommunication Union, Feb. 2018, 692 Pages.

R-L Liao (Panasonic), et al., "CE10.3.1.b: Triangular Prediction Unit Mode", 12. JVET Meeting, Oct. 3, 2018-Oct. 12, 2018, Macao, (The Joint Video Exploration Team of ISO/IEC JTC 1/SC 29/WG 11 and ITU-T SG.16), No. JVET-L0124-V2, Nov. 1, 2018 (Nov. 1, 2018), XP030198593, 8 Pages Retrieved from the Internet: URL: http://phenix.int-evry.fr/jvet/doc_end_user/documents/12_Macao/wg11/JVET-L0124-v6.zip JVET-L0124-v2.doc [retrieved on Nov. 1, 2018], the whole document.

Wang H., et al., "CE10-related: Modifications of Triangular PU Mode", 13. JVET Meeting, Jan. 9, 2019-Jan. 18, 2019, Marrakech, MA, (The Joint Video Exploration Team of ISO/IEC JTC1/SC29/WG11 and ITU-T SG.16), No. JVET-M0399, pp. 1-6.

Wang (QUALCOMM) H., et al., "CE10-related: Using Inter Merge List Derivation for Triangle Mode", 13. JVET Meeting, Jan. 9, 2019-Jan. 18, 2019, Marrakech, MA, (The Joint Video Exploration Team of ISO/IEC JTC1/SC29/WG11 and ITU-T SG.16), No. JVET-M0851-V3, pp. 1-3.

Wang (QUALCOMM) H, et al., "CE10-related: Using Regular Merge Index Signaling for Triangle Mode", 13. JVET Meeting, Jan. 9, 2019-Jan. 18, 2019, Marrakech, (The Joint Video Exploration Team of ISO/IEC JTC1/SC29/WG11 and ITU-T SG.16), No. JVET-M0883, Jan. 14, 2019 (Jan. 14, 2019), XP030202180, 3 Pages, Retrieved from the Internet: URL:http://phenix.int-evry.fr/jvet/doc_end_user/documents/13_Marrakech/wg11/JVET-M0883-v1.zip JVET-M0883.docx [retrieved on Jan. 14, 2019], the whole document.

* cited by examiner

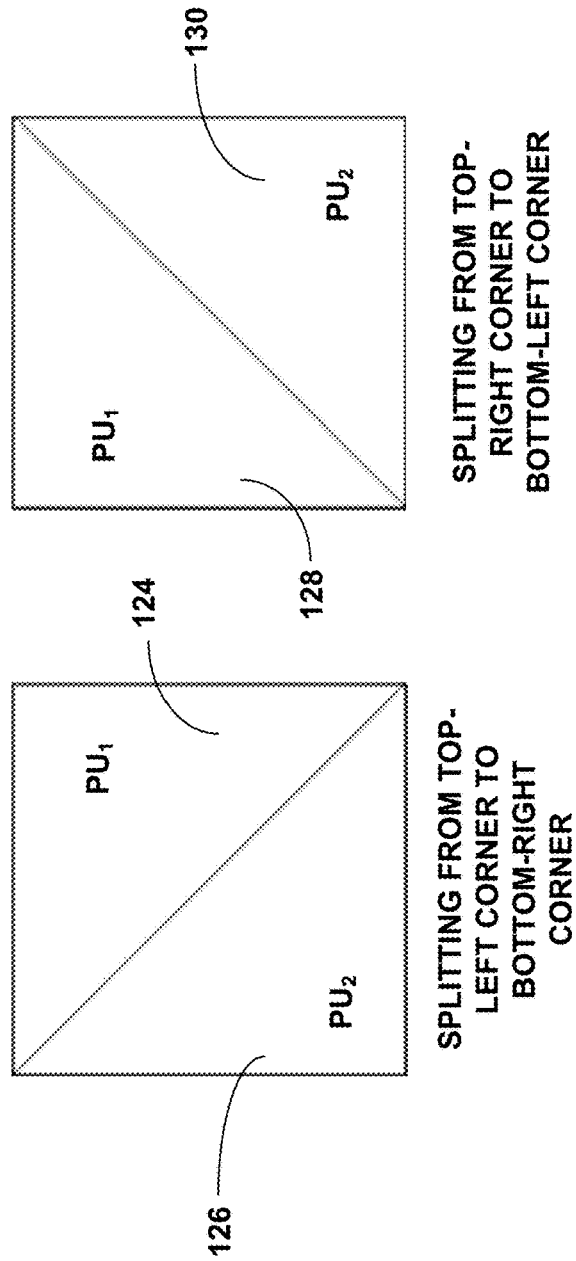

TRIANGLE MOTION INFORMATION FOR VIDEO CODING

This application claims the benefit of U.S. Provisional Application No. 62/775,802, filed Dec. 5, 2018, the entire content of which is incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for coding triangular shaped coding units (CUs) and prediction units (PUs). Triangular CUs or PUs can be conceptually considered as a rectangular block divided into two triangles. As one example, the rectangular block may be split from the top-left corner to the bottom-right corner. As another example, the rectangular block may be split from the top-right corner to the bottom-left corner. A video coder may determine motion information for each of the two triangular CUs or PUs utilizing example techniques described in this disclosure.

One way to determine the motion information for the PUs of the CU is based on a motion vector predictor list that includes motion vector information of neighboring blocks. A video encoder may determine a first index into the motion vector predictor list for a first triangular PU and a second index into the motion vector predictor list for a second triangular PU.

To reduce the amount of information that the video encoder needs to signal, if the value of the second index is greater than the value of the first index, the video encoder may subtract an offset from the value of the second index, and signal the resulting value. The video decoder receives the value and adds back the offset to determine the value of the second index. In this way, the example techniques may promote bandwidth efficiency.

For instance, by subtracting an offset from the value of the second index, the resulting value is smaller than the value of the second index. In some examples, fewer bits are needed to binarize smaller values. Therefore, the number of bits that need to be signaled for the value resulting from the subtraction of the offset from the value of the second index may be less than the number of bits that need to be signaled for the value of the second index.

In one example, the disclosure describes a method of decoding video data, the method comprising determining that a current block is partitioned in a triangle mode, constructing a motion vector predictor list that includes motion vector information of one or more neighboring blocks of the current block, decoding a first value for determining a first index value in the motion vector predictor list, determining a first triangular prediction block based on the first index value, decoding a second value for determining a second index value in the motion vector predictor list, determining the second index value based on the second value, wherein determining the second index value comprises, based on the second value being greater than or equal to the first value, adding an offset to the second value to determine the second index value, determining a second triangular prediction block based on the second index value, and reconstructing the current block based on the first triangular prediction block and the second triangular prediction block.

In one example, the disclosure describes a device for decoding video data, the device comprising memory configured to store a motion vector predictor list that includes motion vector information of one or more neighboring blocks of a current block and processing circuitry. The processing circuitry is configured to determine that the current block is partitioned in a triangle mode, construct the motion vector predictor list, for storage in the memory, that includes the motion vector information of the one or more neighboring blocks of the current block, decode a first value for determining a first index value in the motion vector predictor list, determine a first triangular prediction block based on the first index value, decode a second value for determining a second index value in the motion vector predictor list, determine the second index value based on the second value, wherein to determine the second index value, the processing circuitry is configured to, based on the second value being greater than or equal to the first value, add an offset to the second value to determine the second index value, determine a second triangular prediction block based on the second index value, and reconstruct the current block based on the first triangular prediction block and the second triangular prediction block.

In one example, the disclosure describes a method of encoding video data, the method comprising determining that a current block is partitioned in a triangle mode, constructing a motion vector predictor list that includes motion vector information of one or more neighboring blocks of the current block, determining a first triangular prediction block, determining a first index value in the motion vector predictor list based on the determined first triangular prediction block, signaling a first value based on the first index value, determining a second triangular prediction block, determining a second index value in the motion vector predictor list based on the determined second triangular prediction block, and signaling a second value based on the second index value, wherein signaling the second value comprises, based on the second index value being greater than the first index value, subtracting an offset from the second index value to generate the second value.

In one example, the disclosure describes a device for encoding video data, the device comprising memory configured to store a motion vector predictor list that includes motion vector information of one or more neighboring blocks of a current block and processing circuitry. The processing circuitry is configured to determine that the current block is partitioned in a triangle mode, construct the motion vector predictor list, for storage in the memory, that includes the motion vector information of the one or more neighboring blocks of the current block, determine a first triangular prediction block, determine a first index value in the motion vector predictor list based on the determined first triangular prediction block, signal a first value based on the first index value, determine a second triangular prediction block, determine a second index value in the motion vector predictor list based on the determined second triangular prediction block, and signal a second value based on the second index value, wherein to signal the second value, the processing circuitry is configured to, based on the second index value being greater than the first index value, subtract an offset from the second index value to generate the second value.

The details of one or more examples are set forth in the accompanying drawings and the description below. Other features, objects, and advantages will be apparent from the description, drawings, and claims.

BRIEF DESCRIPTION OF DRAWINGS

FIGS. 2A and 2B are conceptual diagrams illustrating examples of triangular prediction units (PUs).

FIGS. 3A and 3B are example tables illustrating combination maps for motion information of triangular prediction unit (PU).

DETAILED DESCRIPTION

Figure 1:
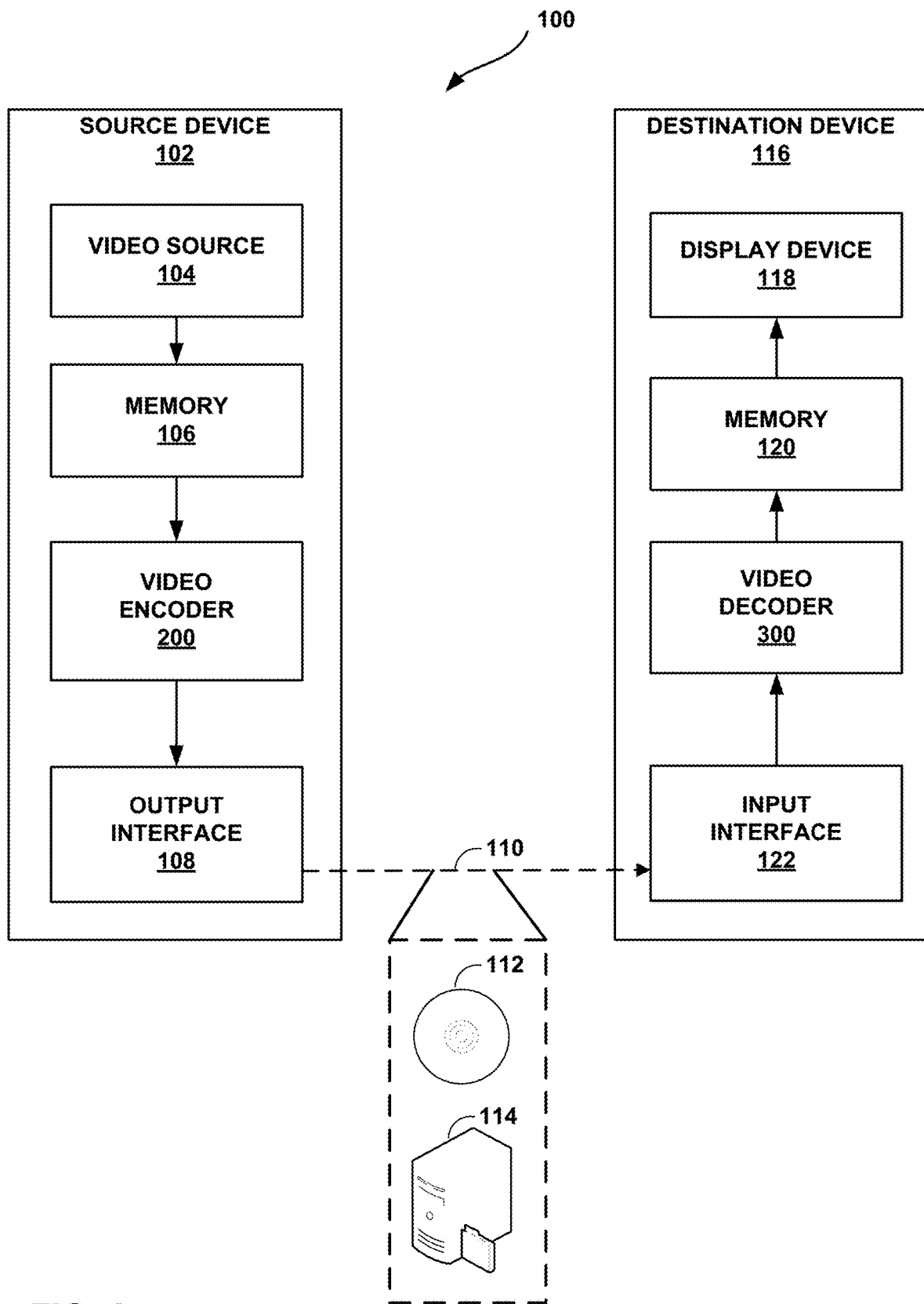
FIG. 1 is a block diagram illustrating an example video encoding and decoding system that may perform the techniques of this disclosure.

In inter-prediction video coding, a video coder (e.g., video encoder or video decoder) determines a prediction unit (PU) for a coding unit (CU). The video encoder determines a residual (e.g., difference) between the sample values of a block of the CU and samples values of a prediction block of the PU. The video encoder signals the residual information to a video decoder along with information that the video decoder uses to determine the PU. The video decoder then adds the residual information to the PU to reconstruct the block.

In some examples, the video coder codes a current block in triangle mode. In triangle mode, the video coder partitions (e.g., splits) a current block into two triangle partitions. In such examples, the video coder may determine PUs for each of the two triangle partitions. The video coder may determine PUs based on motion vectors for the two triangle partitions. The motion vectors point to sample values in reference pictures that may be used to form the PUs. One way to determine motion vectors for the two triangle partitions is based on the motion vector information of one or more neighboring blocks.

For instance, the video encoder and the video decoder may construct a motion vector predictor list that includes motion vector information of one or more neighboring blocks of the current block. The video encoder may signal a first index value into the motion vector predictor list for a first triangle partition of the two triangle partitions of the current block, and the video decoder may determine the motion vector for the first triangle partition based on the first index value. The video encoder may signal a second index value into the motion vector predictor list for a second triangle partition of the two triangle partitions of the current block.

The video decoder may determine a first prediction block for the first triangle partition based on the motion vector for the first triangle partition and determine a second prediction block for the second triangle partition based on the motion vector for the second triangle partition. The video decoder may receive residual information indicative of the difference between the first triangle partition and the first prediction block and the difference between the second triangle partition and the second prediction block. The video decoder may add the respective residual information with the respective first or second prediction blocks to reconstruct the first and second triangle partitions, and in this way, reconstruct the current block.

For the current block coded in triangle mode, there may be certain limitations on the motion vectors for the two triangle partitions. As one example, the two motion vectors for the two triangle partitions may be required to be different. If the two motion vectors for the two triangle partitions were the same, then the two motion vectors would effectively refer to a region that forms a rectangular block. In this case, there would be no difference between coding the current block in triangle mode or regular mode where the current block is not split into triangle partitions. For instance, if there are benefits of coding the current block in triangle mode, then the video encoder should ensure that the motion vectors for the two triangle partitions are different. If the motion vectors for the triangle partitions are to be the same, then the video encoder should code the current block without expending computational resources in splitting the current block into triangle partitions.

Accordingly, to ensure that benefits of coding the current block in triangle mode are achieved, in some examples, the video encoder may determine different index values in the motion vector predictor list. For instance, in constructing the motion vector predictor list, the video coder may prune duplicate motion vector information. As an example, if two neighboring blocks had the same motion vector information, the motion vector predictor list may include motion vector information for only one of the two neighboring blocks. Therefore, the motion vector information in each entry of the motion vector predictor list may be different. Since the index values in the motion vector predictor list for the two triangle partitions are different, there may be a high likelihood that the motion vectors for the two triangle partitions are different because the motion vector information in each entry of the motion vector predictor list may be different.

In one or more examples, the video encoder may leverage the requirement that the index value into the motion vector predictor list needs to be different for the first triangle partition and the second triangle partition to reduce the amount of information that needs to be signaled. As one example, the video encoder may determine a first index value into the motion vector predictor list for a first triangle partition of the current block and signal a first value based on the first index value (e.g., the first value is equal to the first index value). The video encoder may determine a second index value into the motion vector predictor list for a second triangle partition of the current block. However, in this example, if the second index value is greater than the first index value, the video encoder may subtract an offset from the second index value (e.g., subtract one from the second index value) to generate a second value. The video encoder may then signal the second value.

In some examples, signaling smaller values requires fewer bits than signaling larger values. Therefore, by reducing the value that is signaled (e.g., signaling the second value which is a result of subtracting the offset from the second index value rather than the second index value), the video encoder may reduce the number of bits that need to be signaled.

The video decoder may be configured to receive the first value and the second value. The video decoder may determine the first index value into the motion vector predictor list based on the received first value (e.g., the first index value is equal to the received first value). For determining the second index value, the video decoder may determine whether the second value is greater than or equal to the first value. If the second value is greater than or equal to the first value, the video decoder may add the offset (e.g., a value of one) to the second value to determine the second index value into the motion vector predictor list. However, if the second value is less than the first value, then the video decoder may set the second index value equal to the second value.

As an example, there may be five entries in the motion vector predictor list identified by index values: {0, 1, 2, 3, and 4}. In this example, the first index value in the motion vector predictor list for the first triangle partition of the current block may be index value 2. The video encoder may signal a first value of 2 for the first index value. In one case, if the second index value in the motion vector predictor list for the second triangle partition is 3, the video encoder may subtract an offset (e.g., value of one) from the second index value to generate a second value equal to 2 (e.g., 3−1=2). In this example, the video encoder may signal a second value of 2.

The video decoder may receive the first value of 2 and set the first index value in the motion vector predictor list equal to the first value of 2. The video decoder may also receive the second value of 2. In this example, because the second value of 2 is greater than or equal to the first value of 2, the video decoder may add an offset (e.g., value of one) to the second value to determine the second index value of 3 (e.g., 2+1=3) in the motion vector predictor list.

In another case, if the second index value in the motion vector predictor list for the second triangle partition is 1, the video encoder may signal the second value as 1 (e.g., not subtract an offset). In this case, the second index value is less than the first index value, and therefore, the video encoder does not subtract an offset. In this example, the video decoder may receive the second value of 1. Because the second value of 1 is not greater than or equal to the first value of 2, the video decoder may not add an offset. The video decoder may determine that the second index value is equal to the second value of 1.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may be any of a wide range of devices, including desktop computers, notebook (i.e., laptop) computers, tablet computers, set-top boxes, telephone handsets such as smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for coding triangular coding units (CUs) and prediction units (PUs). Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques described in this disclosure. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some example, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memories 106, 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may include one or both of a wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, computer-readable medium 110 may include storage device 112. Source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, computer-readable medium 110 may include file server 114 or another intermediate storage device that may store the encoded video data generated by source device 102. Source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., DSL, cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receiver, modems, wired networking components (e.g., Ethernet cards), wireless communication components that operate according to any of a variety of IEEE 802.11 standards, or other physical components. In examples where output interface 108 and input interface 122 include wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 includes a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may include an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM). The techniques of this disclosure, however, are not limited to any particular coding standard. For example, a new video coding standard referred to as versatile video coding (VVC) is currently under development. The example techniques may be applied to the VVC standard currently under development.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM. According to JEM, a video coder (such as video encoder 200) partitions a picture into a plurality of CTUs. Video encoder 200 may partition a CTU according to a tree structure, such as a quadtree-binary tree (QTBT) structure. The QTBT structure of JEM removes the concepts of multiple partition types, such as the separation between CUs, PUs, and TUs of HEVC. A QTBT structure of JEM includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In some examples, video encoder 200 and video decoder 300 may use a single QTBT structure to represent each of the luminance and chrominance components, while in other examples, video encoder 200 and video decoder 300 may use two or more QTBT structures, such as one QTBT structure for the luminance component and another QTBT structure for both chrominance components (or two QTBT structures for respective chrominance components).

Video encoder 200 and video decoder 300 may be configured to use quadtree partitioning per HEVC, QTBT partitioning according to JEM, or other partitioning structures. For purposes of explanation, the description of the techniques of this disclosure is presented with respect to QTBT partitioning such as in VVC. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value.

The samples in a CU may be arranged in rows and columns. Moreover, CUs need not necessarily have the same number of samples in the horizontal direction as in the vertical direction. For example, CUs may include N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

JEM and VVC also provides an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. JEM and VVC provides sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

The following describes techniques related to coding triangle motion information. In some examples, the motion information of a triangular PU is encoded in a combined manner. For instance, as described above, video encoder 200 and video decoder 300 may encode or decode, respectively, a block in merge mode or AMVP mode. In merge mode or AMVP mode, video encoder 200 and video decoder 300 construct a motion vector predictor list using similar techniques such that the motion vector predictor list that video encoder 200 constructs is substantially the same as, including identical to, the motion vector predictor list that video decoder 300 constructs.

To construct the motion vector predictor list, video encoder 200 and video decoder 300 may determine motion vector information of spatially neighboring and collocated blocks. Spatially neighboring blocks refer to blocks that are in the same picture as the current block being encoded or decoded and are immediately adjacent to the current block. Collocated blocks refer to blocks that are in a different picture than the picture that includes the current block being encoded or decoded and tend to be located bottom-right or center of the current block but in the other picture. In some examples, video encoder 200 and video decoder 300 may evaluate one or more of the spatially neighboring blocks and/or collocated blocks and determine the motion vector information for the spatially neighboring and/or collocated blocks. Video encoder 200 and video decoder 300 may construct the motion vector predictor list by including the motion vector information of the spatially neighboring and collocated blocks as entries in the motion vector predictor list. In some examples, history-based motion vector prediction (HMVP) may be enabled. In HMVP, motion vector information of blocks that are not immediately adjacent to the current block may be included in the motion vector predictor list.

The motion vector information in the motion vector predictor list may be used to predict the motion vector for the current block. Hence, the motion vector information in the motion vector predictor list may be referred to as motion vector predictors. For example, video encoder 200 may determine a prediction block for the current block (e.g., based on which reference samples are closest to the original video data), and determine a motion vector that points to the prediction block (or the samples used to generate the prediction block).

In merge mode, video encoder 200 identifies a motion vector predictor that is equal to the determined motion vector. In some examples, video encoder 200 may utilize the motion vector predictors to determine a prediction block (e.g., select the prediction block based on one of the motion vector predictors that is closest to the original video data). In both examples, video encoder 200 signals information indicative of an index value (e.g., an entry) in the motion vector predictor list for the identified motion vector predictor (e.g., motion vector information of a neighboring or collocated block stored in the entry of the motion vector predictor list identified by the index value).

Video decoder 300 receives the information of the index value in the motion vector predictor list and retrieves the motion vector predictor at the entry (e.g., the motion vector information of a neighboring or collocated block stored in the entry of the motion vector predictor list identified by the index value). Video decoder 300 then sets the motion vector for the current block equal to the retrieved motion vector information (e.g., equal to the motion vector predictor).

AMVP mode is similar to merge mode. However, in AMVP mode, rather than the motion vector predictor and the motion vector for the current block being the same, video encoder 200 may signal a motion vector difference (MVD) between the motion vector predictor and the motion vector for the current block. In AMVP mode, video encoder 200 signals information indicative of the index value in the motion vector predictor list for the motion vector predictor and signals a MVD. Video decoder 300 receives the index value and retrieves the motion vector predictor from the motion vector predictor list. Video decoder 300 then adds the MVD to the motion vector predictor to determine the motion vector for the current block.

VVC includes a triangle mode. In the triangle mode, the current block (e.g., rectangular block) is split (e.g., partitioned or divided) into two triangle partitions. Video encoder 200 may determine motion vectors for each of the two triangle partitions that identify the prediction blocks for the two triangle partitions. The direction of how a current block of a coding unit is split into triangle partitions each having respective PUs is illustrated in FIGS. 2A and 2B. For example, the split can be diagonal (e.g., top-left to bottom-right) or anti-diagonal (e.g., top-right to bottom-left) of the block, which splits the CU into two triangular PUs as shown in FIGS. 2A and 2B. For instance, in FIG. 2A, a current block is split from top-left corner to bottom-right corner to form two triangle partitions each having respective prediction units ($PU_1$ 124 and $PU_2$ 126), as shown in FIG. 2A. As described above, a PU includes luma prediction blocks and chroma prediction blocks. Hence, the term "prediction block" is used interchangeably with PU. In FIG. 2B, a current block is split from top-right corner to bottom-left corner to form two triangle partitions each having respective prediction units (PU$_1$ 128 and PU$_2$ 130), as shown in FIG. 2B.

Merge mode and AMVP mode can be extended to a current block coded in triangle mode. For instance, video encoder 200 and video decoder 300 may each construct respective motion vector predictor lists for the current block. Video encoder 200 may determine motion vector predictors for each of the two triangle partitions and signal index values indicative of the entry in the motion vector predictor list for the determined motion vector predictors.

Some techniques combine information indicative of the direction in which a current block is split for the triangle mode and the index values in the motion vector predictor list for the two triangle partitions into one value. For example, a splitting direction can be represented by a 1-bit value (e.g., 0 for one splitting direction and 1 for another splitting direction). The index values in the motion vector list for the two triangle partitions and the 1-bit value for the splitting direction can be combined into a value within the range of [0, 39]. The combination map in VTM-3.0 code is shown in FIGS. 3A and 3B. For example, if the splitting direction is 0 (i.e., Dir0) and index values are 0, 1 for the two triangle partitions respectively, the combined index is 3.

For instance, video encoder 200 may signal the value of 3. In this example, video decoder 300 may evaluate the two tables shown in FIGS. 3A and 3B and determine that the value of 3 is located in the table of FIG. 3A. Therefore, video decoder 300 may determine that the current block is split in direction 0 (e.g., split like FIG. 2A in this example). Also, video decoder 300 may determine that "3" is located in row 0, column 1 in the table of FIG. 3A. Based on the row being 0, video decoder 300 may determine that a first index value in the motion vector predictor list for a first triangle partition of the current block is 0, and based on the column being 1, video decoder 300 may determine that a second index value in the motion vector predictor list for a second triangle partition of the current block is 1.

However, using the tables illustrated in FIGS. 3A and 3B may not be memory or processing efficient. For example, in the coding scheme that uses the tables of FIGS. 3A and 3B, triangular motion information may need to be stored in a look-up table in memory. Also, video encoder 200 and video decoder 300 may need to perform table look-up for each triangular coded CU; thus the complexity is high. For instance, video encoder 200 and video decoder 300 may need to expend processing cycles performing table look-up operations for each block coded in triangle mode.

This disclosure describes example techniques to encode the motion information of triangular CUs efficiently. For each triangular coded CU, a video coder (e.g., video encoder 200 or video decoder 300) may code (e.g., encode or decode) splitting direction and motion information of the two corresponding triangular PUs for the two triangle partitions into or from the bit-stream, respectively. Context adaptive coding techniques may be applied to the syntax elements to achieve higher compression performance.

Also, to achieve better coding performance of the secondly coded triangular PU motion information, the video coder may use the firstly coded motion information to further remove the redundancy in the motion information. For example, if motion information of both triangular PUs is the same, then the block can be treated as a whole CU with that motion information used for prediction. Such a block can be signaled outside of the triangle mode, so this case introduces a redundancy. In other words, if the motion vector information for both triangle partitions is the same, then the two prediction blocks for the two triangle partitions would together form a single rectangular block. In that case, there would be no purpose to code the current block in triangle mode, where two triangle partitions each have motion vector information. Rather, it may be simpler to code the current block in non-triangle mode without wasting computational resources splitting the current block into triangle partitions and coding each of the two triangle partitions.

Therefore, there may be requirements that the motion vectors (e.g., the values of the motion vectors and/or the prediction blocks to which the motion vectors point) for the two triangle partitions should be different. In one example, motion information of each PU in the triangle mode is signaled using an index value in the motion vector predictor list. The index value in the motion vector predictor list for merge mode is referred to as a merge index. For example, a first merge index for a first triangle partition may identify a motion vector predictor from which video decoder 300 determines a first motion vector for the first triangle partition, and a second merge index for a second triangle partition may identify a motion vector predictor from which video decoder 300 determines a second motion vector for the second triangle partition.

In this case, for the second PU merge index signaling, the merge index equal to the merge index of the first PU is removed (i.e., may not be possible to be used). In other words, the merge index used to determine the motion vector for the first triangle partition cannot be the merge index used to determine the motion vector for the second triangle partition. In this way, the chances that the motion vectors for the first and second triangle partitions are the same may be greatly reduced.

In one example, instead of checking a candidate index of both partitions, the actual motion information (motion vector (MV), reference index, weighted parameters, etc.) is checked. Candidates having the same motion information as in the first triangular PU are excluded from being used or being signaled for the second PU. For example, rather than just ensuring that the index values in the motion vector predictor list are different, video encoder 200 may determine the motion vector value, the index into the reference picture list to which the motion vector points, weighted parameters, and the like for an entry identified by a first index value in the motion vector predictor list. Video encoder 200 may then not select motion vector information identified by a second index value in the motion vector predictor list if the motion vector value, the index into the reference picture list to which the motion vector points, weighted parameters, and the like for the motion vector predictor in the entry identified by the second index value are the same. That is, rather than just ensuring that the index values for the motion vector predictors for the first and second triangle partitions are different, video encoder 200 may ensure that the motion vector information for the first and second triangle partitions is different by further comparing the actual motion vector information stored in the different entries identified by the different index values.

The triangle mode can be extended to work with other inter prediction modes, such as AMVP (advance motion vector prediction), affine mode, etc. In such examples, a merge index may be replaced with mode candidate index in accordance with one or more examples described in this disclosure.

For example, for AMVP mode, when reference index, MV (motion vector) predictor index, and MVD are signaled, the case when the second PU has the same final motion information, which is obtained by adding MVP to MVD, as in the first PU is restricted from being used (e.g., motion information for the first PU and the second PU cannot be the same). That is, the motion information of the second PU (e.g., the MVP plus the MVD for the second PU) may not be allowed to be equal to the motion information for the first PU, and therefore there may be a different MVP or MVD to ensure motion information is not the same as the first PU or AMVP may not be available. As one example, ensuring that motion information for the second PU is not the same as the motion information for the first PU can be done as a bitstream constraint or syntax constraint, where syntax constraint means that a certain syntax combination is not possible, and that redundancy can be removed to lower the overhead.

Some examples of techniques related to coding triangle motion information are described. The example techniques may be used together or separately.

In one or more example techniques described in this disclosure, video encoder 200 may reduce the amount of information that needs to be signaled to video decoder 300 to promote bandwidth efficiencies. As described above, index values into the motion vector predictor lists for the first and second triangle partitions of the current block should be different. It may be possible to leverage the requirement that the two index values into the motion vector predictor list need to be different to reduce the amount of data that needs to be signaled.

Figure 4:
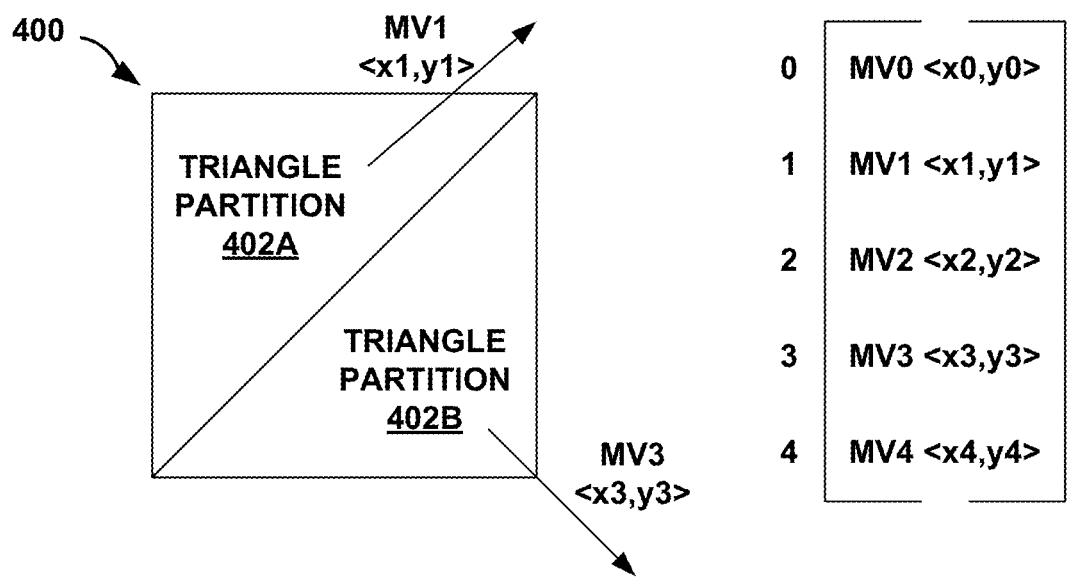
FIG. 4 is a conceptual diagram illustrating an example of determining motion information.

FIG. 4 is a conceptual diagram illustrating an example of determining motion information. FIG. 4 illustrates current block 400 that is divided into triangle partition 402A and triangle partition 402B. FIG. 4 also illustrates a motion vector predictor list that includes five entries identified by index values 0-4. Each entry includes a motion predictor. For example, a first entry identified by index value 0 stores MV0 having motion vector values of <x0, y0>, a second entry identified by index value 1 stores MV1 having motion vector values of <x1, y1>, a third entry identified by index value 2 stores MV2 having motion vector values of <x2, y2>, a fourth entry identified by index value 3 stores MV3 having motion vector values of <x3, y3>, and a fifth entry identified by index value 4 stores MV4 having motion vector values of <x4, y4>.

In this example, video encoder 200 may determine that current block 400 is partitioned in a triangle mode. Video encoder 200 may construct a motion vector predictor list that includes motion vector information of one or more neighboring blocks of current block 400 as illustrated in FIG. 4.

In some examples, video encoder 200 may determine a first triangular prediction block (e.g., for triangle partition 402A). For example, video encoder 200 may evaluate the motion vector predictors in the motion vector predictor list and identify a plurality of triangular blocks. Video encoder 200 may compare each of the triangular blocks to triangle partition 402A and may determine the triangular block that is closest to the first triangle partition as the first triangular prediction block (e.g., in terms of SAD, SSD, or MAD, as a few examples).

Video encoder 200 may determine a first index value in the motion vector predictor list based on the determined first triangular prediction block. For example, as illustrated in FIG. 4, for triangle partition 402A, video encoder 200 may have determined that the motion vector predictor to use is MV1<x1, y1>, which is stored at the entry identified by index value 1. In this example, the first index value may be index value 1. Video encoder 200 may signal a first value based on the first index value. For example, video encoder 200 may signal a value of 1 based on the first index value being a value of 1 in this example.

Using a similar technique to that described above, video encoder 200 may determine a second triangular prediction block (e.g., for triangle partition 402B). For example, video encoder 200 may evaluate the motion vector predictors in motion vector predictor list and identify a plurality of triangular blocks. Video encoder 200 may compare each of the triangular blocks to triangle partition 402B and may determine the triangular block that is closest to the second triangle partition as the second triangular prediction block.

Video encoder 200 may determine a second index value in the motion vector predictor list based on the determined second triangular prediction block. For example, as illustrated in FIG. 4, for triangle partition 402B, video encoder 200 may have determined that the motion vector predictor to use is MV3<x3, y3>, which is stored at the entry identified by index value 3. In this example, the second index value may be index value 3.

In accordance with one or more examples described in this disclosure, because the second index value is greater than the first index value, video encoder 200 may be configured to signal a reduced value rather than the value of the second index value. For example, video encoder 200 may be configured to determine a second value by subtracting an offset from the second index value. As one example, the offset may be one. Therefore, in this example, video encoder 200 may determine a second value of 2 (e.g., second index value of 3 minus 1 is 2).

Video encoder 200 may signal the second value (e.g., 2) rather than the second index value of 3. In some examples, signaling a smaller value results in requiring fewer bits. As one example, binarizing the value of 2 requires fewer bits than binarizing the value of 3. As another example, when CABAC coding is utilized, how many bits are needed to encode may be based on a range of possible values. If the range is reduced, the number of bits resulting from the CABAC coding is reduced. For instance, for the first value, the range can be 0-4 but for the second value, the range is reduced to 0-3 due to the subtraction (e.g., it is not possible for the second value to be equal to 4).

Video decoder 300 may utilize the signaled first and second values to determine the motion vector predictors for triangle partition 402A and triangle partition 402B. For example, based on information signaled about current block 400, video decoder 300 may determine that current block 400 is partitioned in triangle mode. Similar to video encoder 200, video decoder 300 may construct a motion vector predictor list that includes motion vector information of one or more neighboring blocks of current block 400.

Video decoder 300 may decode a first value for determining a first index value in the motion vector predictor list (e.g., for determining a first index value for triangle partition 402A). In the example of FIG. 4, video decoder 300 may decode a value of 1 for the first value and may determine a first triangular prediction block based on the first index value. For example, video decoder 300 may determine that the first index value is 1 based on the first value being 1. Video decoder 300 may access the entry of the motion vector predictor list identified by the first index value of 1, which in this example is MV1<x1,y1>.

Video decoder 300 may determine a first motion vector (e.g., for triangle partition 402A) based on the MV1 <x1, y1>. For example, for merge mode, video decoder 300 may set the first motion vector equal to MV1. For AMVP mode, video decoder 300 may receive a MVD and may add the MVD to <x1, y1> to determine the first motion vector. Video decoder 300 may then determine the first triangular prediction block as the triangular block pointed to by the first motion vector.

Video decoder 300 may decode a second value for determining a second index value in the motion vector predictor list (e.g., for determining a second index value for triangle partition 402B). In the example of FIG. 4, video decoder 300 may decode a value of 2 for the second value. As described above, although the actual second index value is 3, video encoder 200 may have signaled the value of 2. Therefore, video decoder 300 may decode a value of 2 for the second value.

Video decoder 300 may determine the second index value based on the second value. For example, video decoder 300 may compare the second value (e.g., 2) to the first value (e.g., 1). Based on the second value being greater than or equal to the first value, video decoder 300 may add an offset (e.g., 1 in this example) to the second value to determine the second index value (e.g., 2+1 is 3).

In one or more examples, video decoder 300 may determine a second triangular prediction block based on the second index value. For example, video decoder 300 may determine that the second index value is 3 by adding 1 to the second value of 2. Video decoder 300 may access the entry of the motion vector predictor list identified by the second index value of 3, which in this example is MV3<x3,y3>.

Video decoder 300 may determine a second motion vector (e.g., for triangle partition 402B) based on the MV3<x3,y3>. For example, for merge mode, video decoder 300 may set the second motion vector equal to MV3. For AMVP mode, video decoder 300 may receive a MVD and may add the MVD to <x3, y3> to determine the second motion vector. Video decoder 300 may then determine the second triangular prediction block as the triangular block pointed to by the second motion vector.

Video decoder 300 may then reconstruct current block 400 based on the first triangular prediction block and the second triangular prediction block. For example, video decoder 300 may receive residual information indicative of the difference between triangle partition 402A and the first triangular prediction block. Video decoder 300 may add the first triangular prediction block to the difference to reconstruct triangle partition 402A. Video decoder 300 may receive residual information indicative of the difference between triangle partition 402B and the second triangular prediction block. Video decoder 300 may add the second triangular prediction block to the difference to reconstruct triangle partition 402B.

In the above example, the second index value was greater than the first index value, and therefore, video encoder 200 subtracted an offset (e.g., 1) and video decoder 300 added an offset (e.g., 1). However, in some examples, the second index value may be less than the first index value. For example, assume that the motion vector predictor for triangle partition 402B is MV0 <x0, y0> instead of MV3<x3, y3>.

In this example, video encoder 200 may determine that the second value is 0 based on the second index value being equal to 0 and may signal the second value of 0. Video decoder 300 may decode a second value of 0. Video decoder 300 may compare the second value of 0 to the first value of 1. Based on the second value of 0 not being greater than or equal to the first value of 1, video decoder 300 may not add an offset. Rather, video decoder 300 may determine that the second index value is equal to the second value of 0 and may determine the motion vector predictor for triangle partition 402B as being equal to MV0 <x0, y0>.

As described above, video decoder 300 may determine that current block 400 is partitioned in triangle mode. In some examples, video decoder 300 may determine a partition direction (e.g., splitting direction) based on a received syntax element, separate from the first value and second value. For instance, in one example, the splitting direction is represented by a 1-bit value (D), and the value is encoded via Context Adaptive Binary Arithmetic Coding (CABAC). A context is specifically designed for this value. In this way, the information indicative of the partition direction may be a separate syntax element than information indicative of the index in the motion vector predictor list. That is, video encoder 200 may signal a partition direction for current block 400 based on a syntax element (e.g., 1-bit value (D)), separate from the first value and the second value (e.g., values of 1 and 2 or 1 and 0 in the above example). Video decoder 300 may determine a partition direction for current block 400 based on a received syntax element (e.g., 1-bit value (D)), separate from the first value and the second value (e.g., values of 1 and 2 or 1 and 0 in the above example).

In one or more examples, the motion information of each PU is represented by an integer-valued index of a candidate set corresponding to each PU ($I_1$ and $I_2$). Both $I_1$ and $I_2$ are encoded using CABAC coding, too. For example, in the example of FIG. 4, MV1 is the motion vector predictor used to determine the motion vector for triangle partition 402A, which is then used to determine the triangular prediction block for triangle partition 402A. The index value MV1 (e.g., 1) may be CABAC coded.

The candidate set of the triangle partitions 402A, 402B may be generated separately. The two sets are named as $C_1$ and $C_2$, and the sizes of the candidate sets are $N_1$ and $N_2$. In this example, $I_1$ is encoded first and then $I_2$ is encoded second to illustrate how the encoding performance of $I_2$ can be improved by utilizing the information of $I_1$. A function may be defined which returns the index of a motion vector (MV) within a candidate set (C):

$$Idx(C, MV) = \begin{cases} \text{the smallest } I \text{ s.t. } C[I] = MV & \text{if } MV \in C \\ +\infty & \text{if } MV \notin C \end{cases}$$

If $Idx(C_2,MV_1)<I_2$, then encode $I'_2=I_2-1$ otherwise encode $I'_2=I_2$. According to the example, if $Idx(C_2,MV_1)\neq+\infty$, then the range of $I'_2$ becomes $[0, N_2-2]$ instead of $[0, N_2-1]$. In this example, MV1 refers to the motion vector or the motion vector predictor for determining a first triangular prediction block. In some examples, MV1 may not be present in the motion vector predictor list so that the motion vector for a second triangular prediction block is not the same as the motion vector for the first triangular prediction block.

In entropy coding schemes used by video encoder 200 and video decoder 300, the number of bits consumed by an integer-valued index is usually related to the range of that value. Decreasing the size of the value range can improve the coding efficiency. In other words, as described above, for CABAC coding, by decreasing the value of the second value by an offset, the range of the second value is reduced (e.g., the range of the second value in the example of FIG. 4 can only be from 0 to 3). However, if there is no subtraction of the offset, then the range for the second value would be 0 to 4 (e.g., no reduction in the range). Since the number of bits consumed by signaling the value of 2 in the example of FIG. 4 is based on the range of the value, then the number of bits consumed by signaling 2 would be less than the number of bits consumed by signaling 3 if the range of the value were not reduced.

In some examples, the splitting direction is represented as a 1-bit value, and the value is encoded via by-pass mode of CABAC. Again, video encoder 200 may signal a partition direction for current block 400 based on a syntax element (e.g., 1-bit value (D)), separate from the first value and the second value (e.g., values of 1 and 2 or 1 and 0 in the above example). Video decoder 300 may determine a partition direction for current block 400 based on a received syntax element (e.g., 1-bit value (D)), separate from the first value and the second value (e.g., values of 1 and 2 or 1 and 0 in the above example).

At the same time, the two triangular PUs share a same candidate set ($C_1=C_2=C$, $N_1=N_2=N$), in this case for any given motion vector (MV), there may be $Idx(C_1,MV)=Idx(C_2,MV)$. Information of $I_1$ can be used as follows when encoding $I_2$: If $I_1<I_2$, then encode $I'_2=I_2-1$, otherwise encode $I'_2=I_2$. In this case, the range of $I_1$ is [0,N−1] and the range of $I_2'$ is always [0, N−2]. The above restates the example where based on the second index value being greater than the first index value, video encoder 200 subtracts an offset from the second index value to generate a second value that video encoder 200 signals, and video decoder 300 adds an offset to the received second value based on the second value being greater than or equal to the first value to generate the second index value in the motion vector predictor list.

The following describes techniques for constructing the motion vector predictor list for block coded in triangle mode. In VVC, the triangle mode has its own merge candidate list derivation method, which is different from the merge candidate list derivation used in merge mode for non-triangle modes. There may be an increase in the implementation burden because of the different derivation techniques. The VVC triangle mode candidate list includes five uni-prediction motion vector candidates used for triangular PU coding and are derived by two steps.

In step 1, up to 7 motion vectors from neighboring blocks are used to build a candidate set $C_{step1}$. In some techniques, the procedure to build $C_{step1}$ is exclusively used by triangle mode. However, in regular merge mode, a candidate set $C_{merge}$ is built for a similar goal. Having different logic of $C_{merge}$ and $C_{step1}$ may increase the complexity of hardware and software design.

In step 2, the motion vectors in $C_{step1}$ are looped over for multiple times and up to 5 uni-prediction MVs are derived for the final candidate $C_{step2}$. The detailed procedure is as follows.

1. For each MV in $C_{step1}$, if MV is uni-prediction and MV is not in $C_{step2}$, add MV to $C_{step2}$.
2. For each MV in $C_{step1}$, if MV is bi-prediction and Reference List 0 part of MV ($MV_{part0}$) is not in $C_{step2}$, add $MV_{part0}$ to $C_{step2}$.
3. For each MV in $C_{step1}$, if MV is bi-prediction and Reference List 1 part of MV ($MV_{part1}$) is not in $C_{step2}$, add $Mv_{part1}$ to $C_{step2}$.
4. For each MV in $C_{step1}$, if MV is bi-prediction and the average of $MV_{part0}$ and $MV_{part1}$ ($MV_{avg}$) is not in $C_{step2}$, add $MV_{avg}$ to $C_{step2}$.
5. If Sizeof ($C_{step2}$)<5, fill the remaining slots with 0-valued MVs.

At any step, if Sizeof ($C_{step2}$) becomes 5, the procedure ends immediately.

To perform the 'average' operation used in the $4^{th}$ pass of step 2, two motion vectors that point to same reference picture are needed. However, the reference list 0 part and reference list 1 part of the bi-prediction motion vector may point to different reference pictures. That is, bi-prediction motion vectors include two motion vectors. A first motion vector points to a picture identified in a first reference picture list (list 0) and a second motion vector points to a picture identified in a second reference picture (list 1). The reference list 0 part refers to the first motion vector into the picture in reference picture list 0, and the reference list 1 part refers to the second motion vector into the picture in reference picture list 1. In such cases, reference list 1 part of the bi-prediction motion vector may need to be scaled to the same reference picture of reference list 0 part. The scaling is based on $POC_{current}-POC_{reference\_picture\_list\_0}$ and $POC_{current}-POC_{reference\_picture\_list\_1}$.

The step 2 described above may have two problems:

Step 2 works in a multi-pass manner. The motion information derived from the last item of $C_{step1}$ may become the first item of $C_{step2}$, so step 2 cannot start until step 1 is completely finished.

The scaling of motion vector has high complexity, especially for a hardware codec design. Meanwhile, the $4^{th}$ pass of step 2 may have multiple scaling operations which may greatly increase the codec complexity.

This disclosure describes example techniques that may provide a more unified and simpler approach in deriving the uni-prediction candidate list. The example techniques may use an existing candidate list derivation process. For instance, for the merge mode, the technique can be merge candidate list derivation. The output of this derivation process is referred to as $C_{merge}$. Since triangle mode uses uni-prediction for each PU, then the bi-prediction MV in the merge list derivation is split into two: uni-L0 and uni-L1 MVs, which can both be added to the candidate list (referred to as $C_{triangle}$) for the triangle mode. In some examples, only one may be added to the candidate list. In this case, the candidate list derivation is shared with the merge mode and only splitting bi-MV into uni-MV needs to be added.

In other words, video encoder 200 and video decoder 300 may construct an initial motion vector predictor list that includes both bi-prediction and uni-prediction motion vectors. Bi-prediction motion vectors refer to motion vectors of neighboring blocks that are inter-predicted with two motion vectors: one that points to a block in a picture identified in a first reference picture list and one that points to a block in a picture identified in a second reference picture list. Uni-prediction motion vectors refer to motion vectors of neighboring blocks that are inter-predicted with one motion vector.

For non-triangle mode (e.g., current block is not partitioned in triangle mode), the motion vector predictor list may include both bi-prediction and uni-prediction motion vectors. However, for triangle mode, the motion vector predictor list may only include uni-prediction motion vectors. Accordingly, to provide some unification in the construction of the motion vector predictor list, video encoder 200 and video decoder 300 may construct an initial motion vector predictor list in a similar manner as for non-triangle mode such that the initial motion vector predictor list includes both bi-prediction motion vectors and uni-prediction motion vectors. Then, video encoder 200 and video decoder 300 may construct the motion vector predictor list based on the initial motion vector predictor list (e.g., by separating out the bi-prediction motion vectors into two separate entries in the motion vector predictor list, as one non-limiting example).

The uni-MVs can be added to the list one after another one, or one of the candidates can be added at a later position in the candidate list. Additionally, the same merge list derived once for triangular CU can be used for both PUs. In some examples, the redundancy removal can be done as described above.

In one implementation example, in the first step of candidate list generating, merge candidate list $C_{merge}$ is generated. $C_{merge}$ may contain both bi-prediction and uni-prediction MVs. To be used for triangular PU motion compensation, each bi-prediction MV can be replaced with two uni-prediction MVs (uni-L0 part and uni-L1 part of the MV). In other words, the bi-prediction motion vectors are separated into two uni-prediction motion vectors: one of the uni-prediction motion vector points to a block in a picture in reference picture list 0 and another of the uni-prediction motion vector points to a block in a picture in reference picture list 1. After redundancy removal, the final $C_{triangle}$ is generated.

The details of the conversion from $C_{merge}$ to $C_{triangle}$ of the implementation example is described as follows:

| | |
|---|---|
| 1 | Init $C_{triangle}$ to Empty |
| 2 | For Each MV in $C_{merge}$ |
| 3 |   If MV is uni-prediction |
| 4 |     If not MV already in $C_{triangle}$ |
| 5 |       Add MV to $C_{triangle}$ |
| 6 |       If Sizeof ($C_{triangle}$) == $N_{triangle}$ Then Goto 18 |
| 7 |   Else |
| 8 |     $MV_0$ = RefList 0 part of MV |
| 9 |     $MV_1$ = RefList 1 part of MV |
| 10 |     If not $MV_0$ already in $C_{triangle}$ |
| 11 |       Add $MV_0$ to $C_{triangle}$ |
| 12 |       If Sizeof ($C_{triangle}$) == $N_{triangle}$ Then Goto 18 |
| 13 |     If not $MV_1$ already in $C_{triangle}$ |
| 14 |       Add $MV_1$ to $C_{triangle}$ |
| 15 |       If Sizeof ($C_{triangle}$) == $N_{triangle}$ Then Goto 18 |
| 16 |   If not sizeof ($C_{triangle}$) == $N_{triangle}$ |
| 17 |     Fill the remaining slots with 0 valued MVs |
| 18 | Output $C_{triangle}$ |

In another implementation example, the generation of $C_{merge}$ and $C_{triangle}$ described above is designed in a pipelined way so that the latency of candidate set generating can be further reduced, especially for a hardware codec design.

The generation of regular merge candidates $C_{merge}$ as a standalone procedure is described as follows. The Pruning test succeeded procedure called in the pseudo code represents the redundancy removal defined by a standard merge mode (e.g., the output $C_{merge}$ has a maximum size of $N_{merge}$).

| | |
|---|---|
| 1 | GENERATE_C_Merge ($N_{merge}$) |
| 2 | Init $C_{merge}$ to Empty |
| 3 | For each MV to be considered |
| 4 |   If Pruning_test_succeeded ($C_{merge}$, MV) and Sizeof ($C_{merge}$) < $N_{merge}$ |
| 5 |     Add MV to $C_{merge}$ |
| 6 | Return $C_{merge}$ |

The generation of $C_{triangle}$ shares the logic of GENERATE_C_Merge( ) for $C_{merge}$ generation and converts the members of $C_{merge}$ to members of $C_{triangle}$ on the fly. The generated $C_{triangle}$ has a maximum size of $N_{triangle}$.

| | |
|---|---|
| 1 | GENERATE_C_Triangle ($N_{merge}$, $N_{triangle}$) |
| 2 | Init $C_{triangle}$ and $C_{merge}$ to Empty |
| 3 | For each MV to be considered |
| 4 |   If Pruning_test_succeeded ($C_{merge}$, MV) and Sizeof ($C_{merge}$) < $N_{merge}$ |
| 5 |     Add MV to $C_{merge}$ |
| 6 |     If MV is uni-prediction |
| 7 |       If not MV already in $C_{triangle}$ |
| 8 |         Add MV to $C_{triangle}$ |
| 9 |         If Sizeof ($C_{triangle}$) == $N_{triangle}$ Then Goto 21 |
| 10 |     Else |
| 11 |       $MV_0$ = RefList 0 part of MV |
| 12 |       $MV_1$ = RefList 1 part of MV |
| 13 |       If not $MV_0$ already in $C_{triangle}$ |
| 14 |         Add $MV_0$ to $C_{triangle}$ |
| 15 |         If Sizeof ($C_{triangle}$) == $N_{triangle}$ Then Goto 21 |
| 16 |       If not $MV_1$ already in $C_{triangle}$ |
| 17 |         Add $MV_1$ to $C_{triangle}$ |
| 18 |         If Sizeof ($C_{triangle}$) == $N_{triangle}$ Then Goto 21 |
| 19 |   If not sizeof ($C_{triangle}$) == $N_{triangle}$ |
| 20 |     Fill the remaining slots with 0 valued MVs |
| 21 | Return $C_{merge}$ |

The following describes motion information storage. The variable NoBackwardPredFlag is derived as follows. NoBackwardPredFlag is a flag to indicate whether all the reference picures of a specific picture have smaller picture order count (POC) than the current picture. If all reference pictures have smaller POC, NoBackwardPredFlag is TRUE. Otherwise, one or more reference picture has a larger POC than the current picture and NoBackwardPredFlag is FALSE. For example, if DiffPicOrderCnt(aPic, CurrPic) is less than or equal to 0 for each picture aPic in RefPicList0 or RefPicList1 of the current slice, NoBackwardPredFlag is set equal to 1. Otherwise, NoBackwardPredFlag is set equal to 0.

Figure 5:
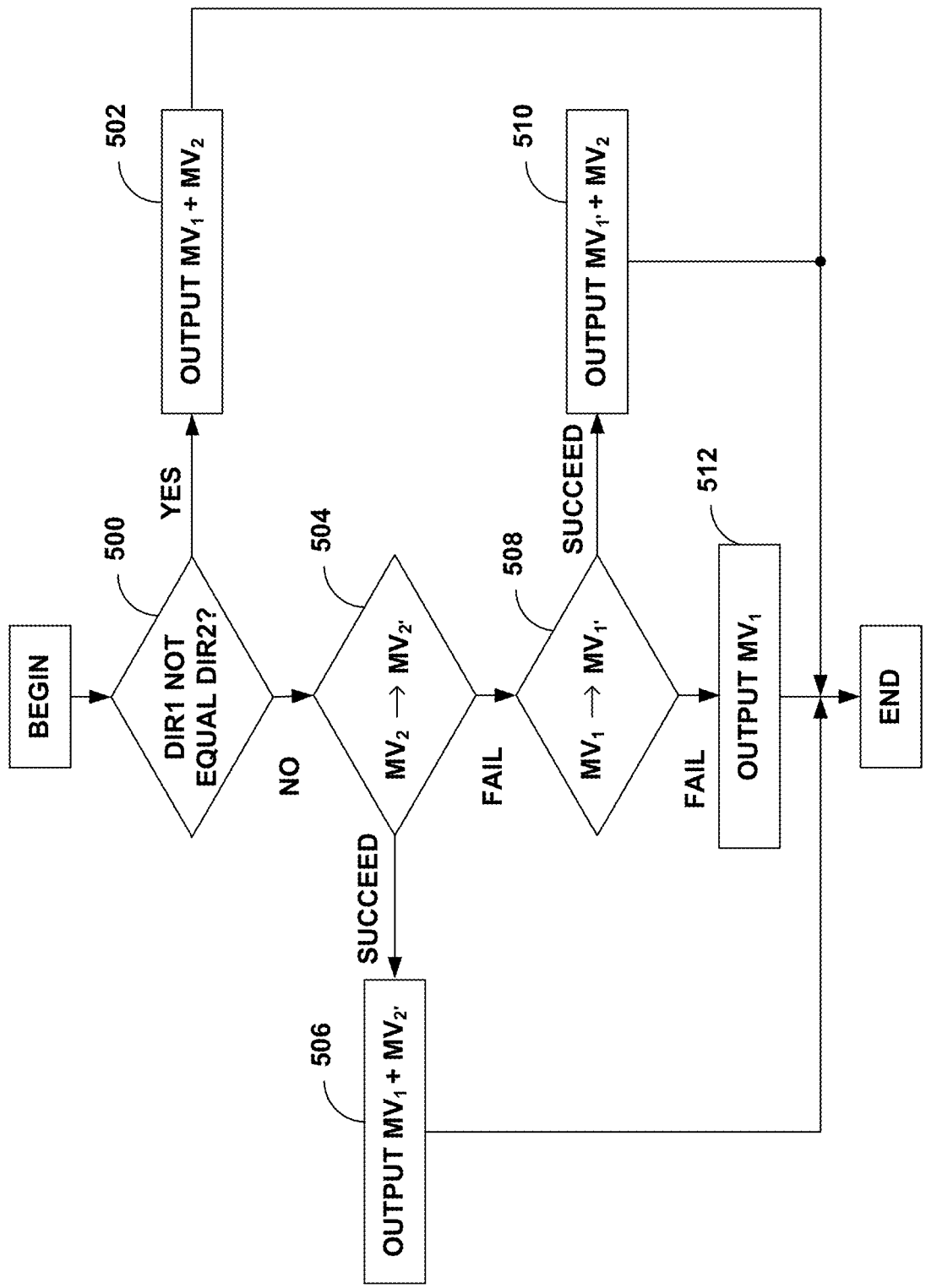
FIG. 5 is a flowchart illustrating an example procedure of motion vector (MV) combination.

The procedure of MV (motion vector) combination is illustrated in FIG. 5. Video encoder 200 and video decoder 300 may determine whether the two motion vectors for the current block have different reference lists (e.g., the first motion vector for the current block refers to a picture in reference picture list 0 and the second motion vector for the current block refers to a picture in reference picture list 1) (500). If the two motion vectors for the current block have different reference lists (YES of 500), then the two motion vectors can be combined directly (expressed as $MV_1+MV_2$ in FIG. 5) (502). Otherwise (NO of 500), one of the MVs can be mapped to the other reference list so that the MV combining can be performed.

For example, if the two MVs point to different lists, then a Bi-MV can be generated by using the MV that points to L0 (i.e., reference picture list 0) as L0 part, and the other MV that points to L1 (i.e., reference picture list 1) as L1 part. If the two MVs point to one list (e.g., L0), then the two MVs may not be combined to a Bi-MV directly, because there is no Bi-MV that contains two L0 components but no L1 components.

$MV_2$ is tested first (504). If the reference picture of $MV_2$ also exists in the other reference list, then the mapping succeeds (SUCCEED of 504), and the output $MV'_2$ can be combined with $MV_1$ (expressed as $MV_1+MV'_2$) (506). Otherwise (FAIL of 504), the same mapping is performed on $MV_1$ for $MV'_1$ (508) for success (SUCCEED of 508) with a combined output of ($MV'_1+MV_2$) (510). If both $MV'_1$ and $MV'_2$ do not exist (FAIL of 508), then the output may be the uni-prediction $MV_1$ as a result (512).

The mapping operation has complexity issues. The mapping from MV to MV' needs to loop over the other reference list to find whether the list contains the reference picture of MV. This is a computationally expensive operation for video encoder 200 and video decoder 300. If the mapping of $MV_2$ fails, the same operation needs to be performed on $MV_1$, so the worst-case complexity is further increased.

Figure 6A:
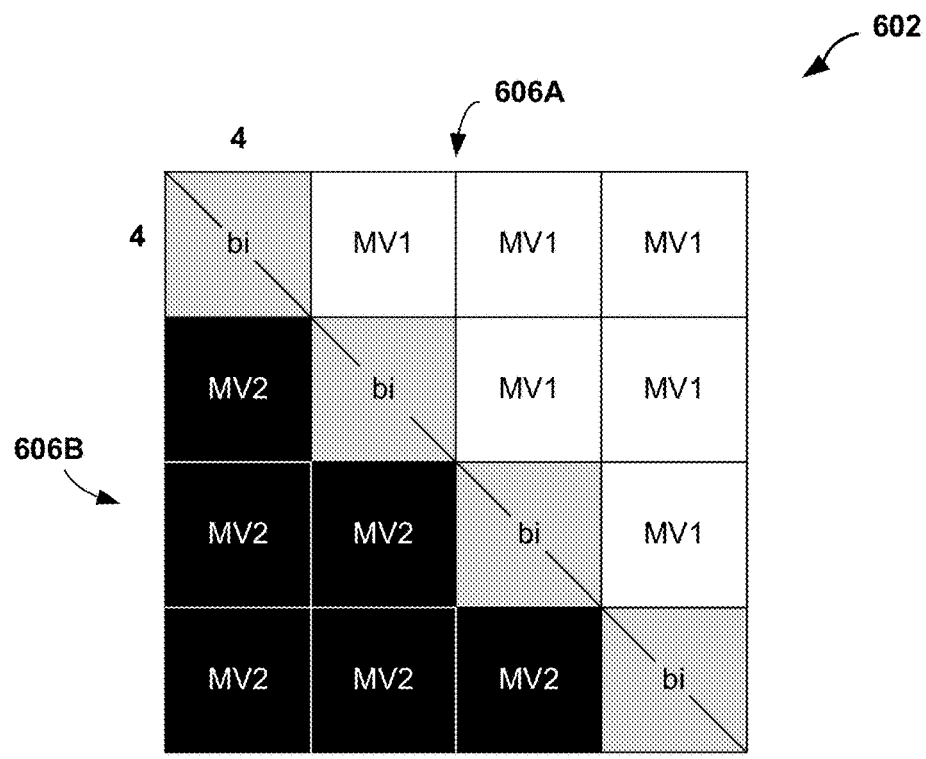
FIGS. 6A and 6B are conceptual diagrams illustrating sub-blocks for triangular PU mode.
Figure 6B:
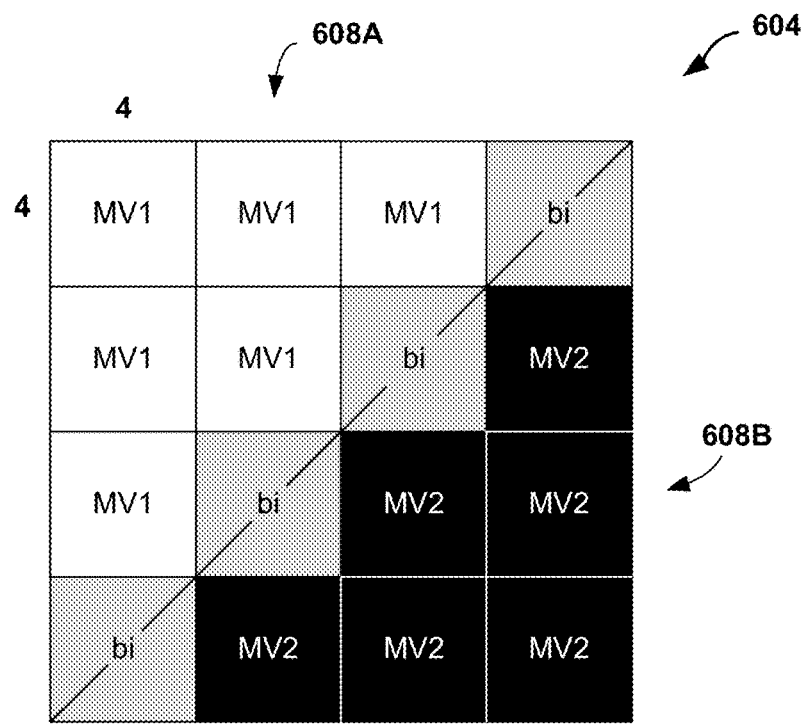

As shown in FIGS. 6A and 6B, for CUs coded with triangular PU mode, the sub-blocks on the diagonal edge of the splitting direction make use of motion-compensated values of both MV1 and MV2; thus a bi-prediction motion vector containing information from both MV1 and MV2 is to be stored as motion information for those sub-blocks. For example, FIG. 6A illustrates block 602 that includes sub-blocks 606A and 606B. Sub-block 606A utilizes MV1 and sub-block 606B utilizes MV2. FIG. 6B illustrates block 604 that includes sub-blocks 608A and 608B. Sub-block 608A utilizes MV1 and sub-block 608B utilizes MV2.

This disclosure describes simplified ways of generating bi-prediction MVs for the motion information storage of triangular PU mode. The two uni-prediction MVs (e.g., the bi-prediction MVs are split into two uni-prediction MVs) are combined (if possible) based on the configuration of reference picture list 0 and reference picture list 1, for example, based on the value of NoBackwardPredFlag. In one example, when NoBackwardPredFlag is true (i.e., all reference pictures are from the past comparing to the current picture), then two uni-prediction MVs from triangular PUs are combined to form a bi-prediction MV and stored in a block coded with the triangle mode. Otherwise, a uni-prediction MV is used. In one example, uni-L0 is used; in the other example uni-L1 is used. In yet another example, the MV of the first triangular PU is used, and the MV of the second triangular PU is used. In some example techniques, MV values of the triangular PUs are checked and based on the checking, the MV selection is done. In some examples, reference picture index or reference picture POC of that motion information is checked, and one is selected based on the determination process. For example, the MV corresponding to the closest reference picture relative to the current picture is chosen. In one example, the example techniques may be performed without any searching operation through a reference list.

The description of details of the implementation examples is as follows. If motion information of the two PUs is on different reference lists, the motion information can be combined via the following procedure:

| | |
|---|---|
| 1 | Combine_From_Different_List (MV1, MV2) |
| 2 | MV.prediction_dir = bi-prediction. |
| 3 | If MV1 uses reference list L0 |
| 4 | MV.reference_index_L0 = MV1.reference_index_L0 |
| 5 | MV.reference_index_L1 = MV2.reference_index_L1 |
| 6 | MV. motion_vector_L0 = MV1.motion_vector_L0 |
| 7 | MV.motion_vector_L1 = MV2.motion_vector_L1 |
| 8 | Else |
| 9 | MV. reference_index_L0 = MV2.reference_index_L0 |
| 10 | MV.reference_index_L1 = MV1 reference_index_L1 |
| 11 | MV. motion_vector_L0 = MV2.motion_vector_L0 |
| 12 | MV.motion_vector_L1 = MV1.motion_vector_L1 |
| 13 | Output MV |

If motion information of the PUs is on different reference lists, the motion information can be combined via the following procedure:

| | |
|---|---|
| 1 | Combine_From_Same_List (MV1, MV2) |
| 2 | If NoBackwardPredFlag == FALSE |
| 3 | MV = MV1 |
| 4 | Else |
| 5 | MV. prediction_dir = bi-prediction. |
| 6 | If MV1 uses reference list L0 |
| 7 | MV.reference_index_L0 = MV1.reference_index_L0 |
| 8 | MV.reference_index_L1 = MV2.reference_index L0 |
| 9 | MV.motion_vector_L0 = MV1.motion_vector_L0 |
| 10 | MV.motion_vector_L1 = MV2.motion_vector_L0 |
| 11 | Else |
| 12 | MV.reference_index_L0 = MV2.reference_index_L1 |
| 13 | MV.reference_index_L1 = MV1.reference_index_L1 |
| 14 | MV.motion_vector_L0 = MV2. motion_vector_L1 |
| 15 | MV.motion_vector_L1 = MV1.motion_vector_L1 |
| 16 | Output MV |

In one implementation example, the Combine_From_Different_List is the same as the example above. The procedure of Combine_From_Same_List is designed as follows, and searching operations are performed when NoBackwardPredFlag is False, but only one searching operation is needed:

| | |
|---|---|
| 1 | Combine_From_Same_List (MV1, MV2) |
| 2 | If NoBackwardPredFlag == FALSE |
| 3 | MV = MV1 |
| 4 | Else |
| 5 | MV.prediction_dir =bi-prediction. RefPOC2 = POC of reference picture of MV2 |
| 6 | If MV1 uses reference list L0 MappedRefIndex2 = Search_List_For_Poc (RefListl, RefPOC2) |
| 7 | MV.reference_index_L0 = MV1.reference_index_L0 |
| 8 | MV.reference_index_L1 = MappedRefIndex2 |
| 9 | MV.motion_vector_L0 = MV1.motion_vector_L0 |
| 10 | MV.motion_vector_L1 = MV2.motion_vector_L0 |
| 11 | Else MappedRefIndex2 = Search_List_For_Poc (RefListO, RefPOC2) |
| 12 | MV.reference_index_L0 = MappedRefIndex2 |
| 13 | MV.reference_index_L1 = MV1.reference_index_L1 |
| 14 | MV.motion_vector_L0 = MV2.motion_vector_L1 |
| 15 | MV.motion_vector_L1 = MV1.motion_vector_L1 |
| 16 | Output MV |
| 17 | Search_List_For_Poc (RefList, POC) |
| 18 | For (I = 0; I < sizeof (RefList); I++) |
| 19 | If RefList[I].POC == POC |
| 20 | Return I |
| 21 | Return +∞ |

Figure 7:
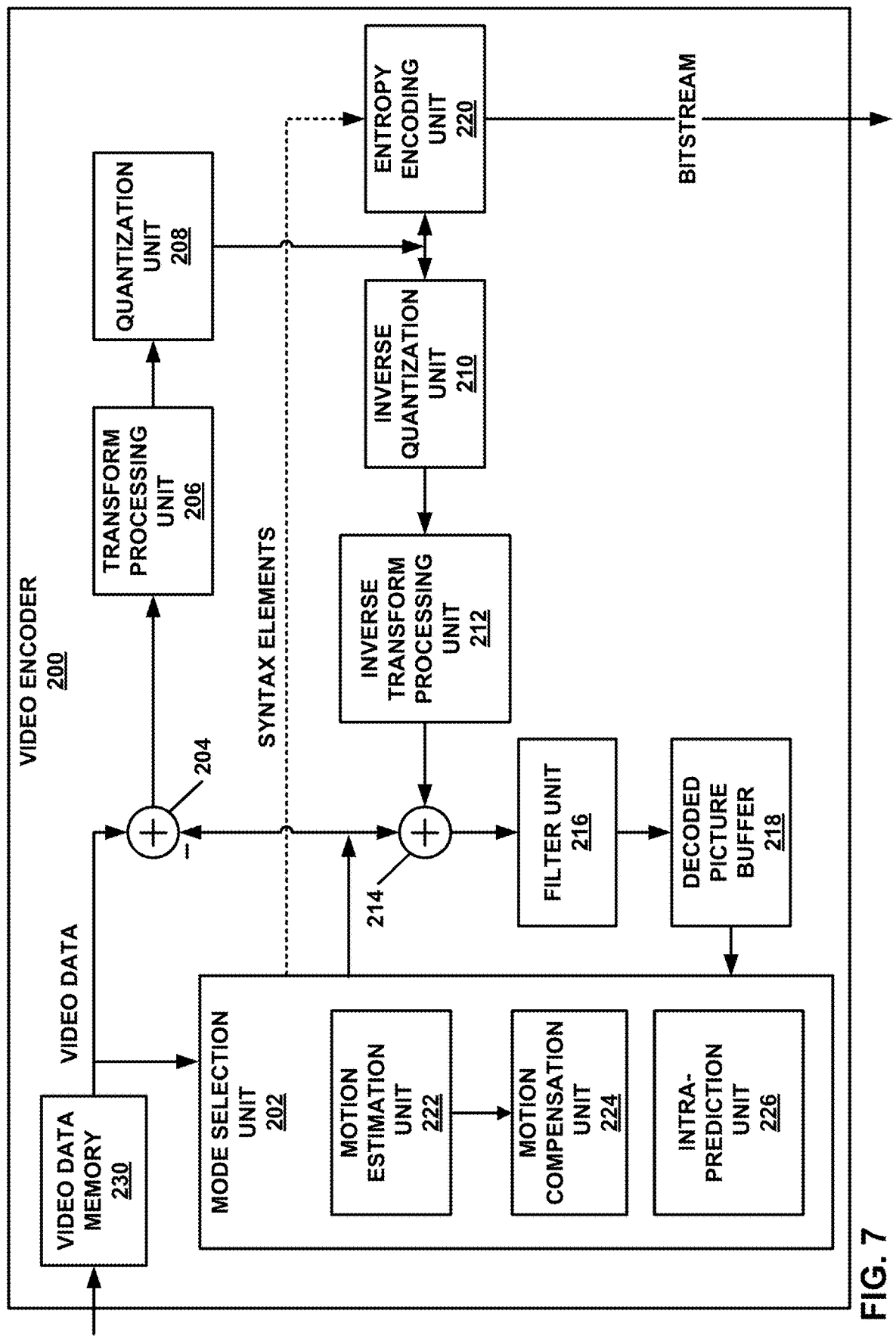
FIG. 7 is a block diagram illustrating an example video encoder that may perform the techniques of this disclosure.

FIG. 7 is a block diagram illustrating an example video encoder 200 that may perform the techniques of this disclosure. FIG. 7 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development (e.g., VVC). However, the techniques of this disclosure are not limited to these video coding standards, and are applicable generally to video encoding and decoding.

In the example of FIG. 7, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 7 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

Mode selection unit 202, motion estimation unit 222, and motion compensation unit 224 may be configured to perform one or more example techniques described in this disclosure. For example, mode selection unit 202 may determine that a first current block is partitioned in a triangle mode. Motion estimation unit 222 may be configured to construct a first motion vector predictor list that includes motion vector information of one or more neighboring blocks of the first current block. For example, motion estimation unit 222 may access DPB 218 for the motion vector information of the neighboring blocks. As one example, motion estimation unit 222 may construct an initial motion vector predictor list that includes both bi-prediction and uni-prediction motion vectors, and construct the first motion vector predictor list based on the initial motion vector predictor list.

Motion estimation unit 222 and motion compensation unit 224 may together determine a first triangular prediction block. In one example, motion estimation unit 222 may determine which triangular prediction block is closest to the first triangle partition of the current block. Motion estimation unit 222 and motion compensation unit 224 may determine a first index value in the motion vector predictor list based on the determined first triangular prediction block. For example, motion estimation unit 222 may determine what motion vector information from the motion vector predictor list should be used as a motion vector predictor to predict a first motion vector that points to the first triangular prediction block. Motion estimation unit 222 may determine a first value based on the first index value (e.g., the first value equals the first index value) and cause entropy encoding unit 220 to encode and signal the first value.

Similarly, motion estimation unit 222 and motion compensation unit 224 may together determine a second triangular prediction block, and determine a second index value in the motion vector predictor list based on the determined second triangular prediction block. In this example, motion estimation unit 222 and motion compensation unit 224 may compare the first index value and the second index value. Based on the second index value being greater than the first index value, motion estimation unit 222 and motion compensation unit 224 may subtract an offset (e.g., 1) from the second index value to generate a second value. Motion estimation unit 222 and motion compensation unit 224 may cause entropy encoding unit 220 to encode and signal the second value.

Motion estimation unit 222 and motion compensation unit 224 may construct a second motion vector predictor list that includes motion vector information of one or more neighboring blocks of a second current block. Using techniques for determining triangular prediction blocks similar to those described above, motion estimation unit 222 and motion compensation unit 224 may determine a third triangular prediction block, and determine a third index value in the second motion vector predictor list based on the determined third triangular prediction block. Motion estimation unit 222 and motion compensation unit 224 may cause entropy encoding unit 220 to encode and signal a third value based on the third index value.

Motion estimation unit 222 and motion compensation unit 224 may determine a fourth triangular prediction block and determine a fourth index value in the second motion vector predictor list based on the determined fourth triangular prediction block. Motion estimation unit 222 and motion compensation unit 224 may compare the fourth index to the third index and based on the fourth index value being less than the third index value, determine a fourth value that is equal to the fourth index value. Motion estimation unit 222 and motion compensation unit 224 may cause entropy encoding unit 220 to encode and signal the fourth value.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as a few examples, mode selection unit 202, via respective units associated with the coding techniques, generates a prediction block for the current block being encoded. In some examples, such as palette mode coding, mode selection unit 202 may not generate a prediction block, and instead generates syntax elements that indicate the manner in which to reconstruct the block based on a selected palette of sample values. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

Figure 8:
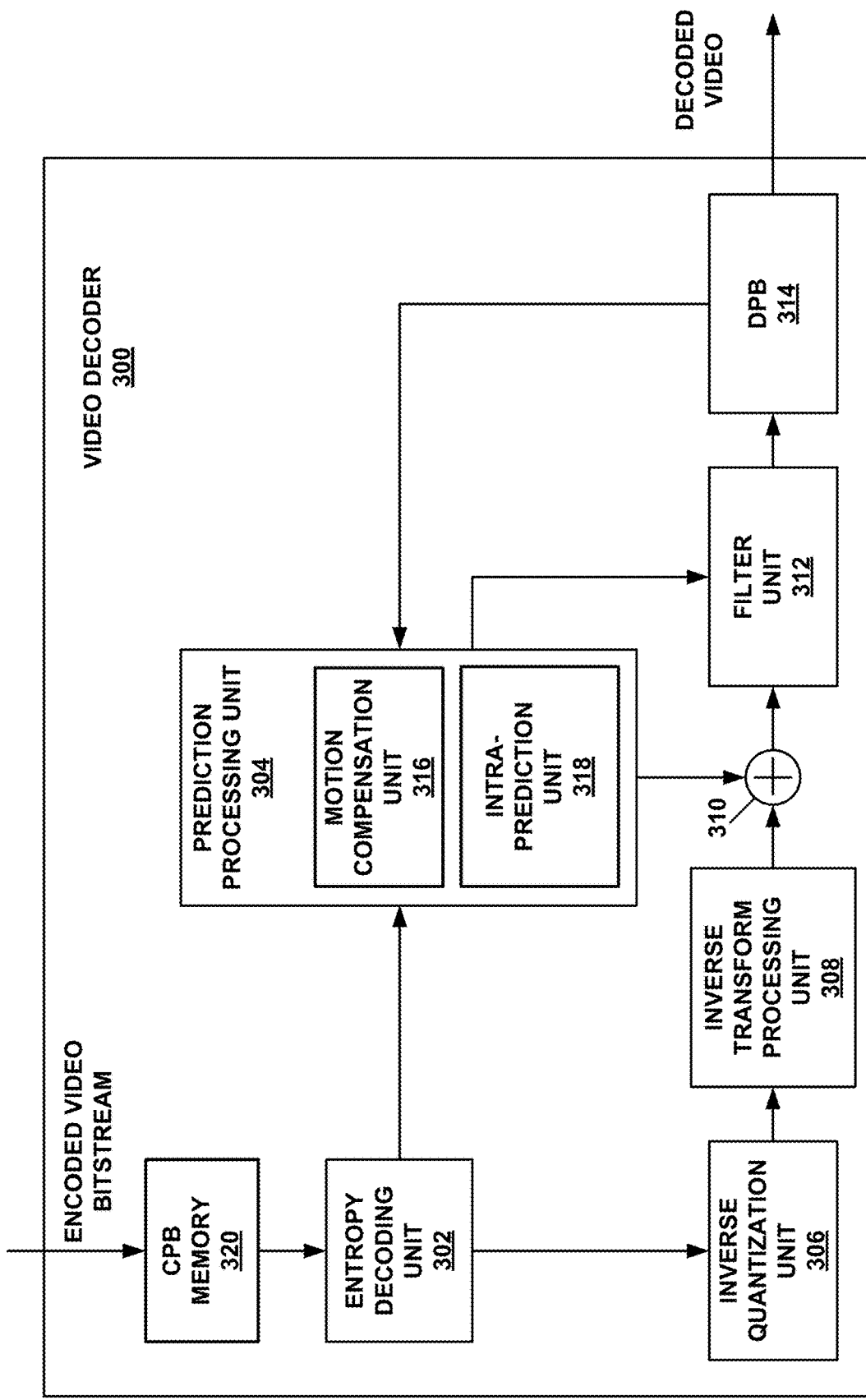
FIG. 8 is a block diagram illustrating an example video decoder that may perform the techniques of this disclosure.

FIG. 8 is a block diagram illustrating an example video decoder 300 that may perform the techniques of this disclosure. FIG. 8 is provided for purposes of explanation and is not limiting on the techniques as broadly exemplified and described in this disclosure. For purposes of explanation, this disclosure describes video decoder 300 in the context of video coding standards such as the HEVC video coding standard and the H.266 video coding standard in development (e.g., VVC). However, the techniques of this disclosure may be performed by video coding devices that are configured to operate according to other video coding standards.

In the example of FIG. 8, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 8 are illustrated to assist with understanding the operations performed by video decoder 300. The units may be implemented as fixed-function circuits, programmable circuits, or a combination thereof. Similar to FIG. 7, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 7).

Motion compensation unit 316, along with entropy decoding unit 302, may be configured to perform example techniques described in this disclosure. For example, motion compensation unit 316 may determine that a first current block is partitioned in a triangle mode. As one example, entropy decoding unit 302 may receive a syntax element separate from information used to determine motion vector information that indicates a partition direction, and motion compensation unit 316 may determine the partition direction for the first current block based on the received syntax element.

Motion compensation unit 316 may construct a first motion vector predictor list that includes motion vector information of one or more neighboring blocks of the current block. For example, motion compensation unit 316 may construct an initial motion vector predictor list that includes both bi-prediction and uni-prediction motion vectors and construct the first motion vector predictor list based on the initial motion vector predictor list. The first motion vector predictor list may be for the current block coded in one of merge mode, advanced motion vector prediction (AMVP) mode, or affine mode Entropy decoding unit 302 may decode a first value for determining a first index value in the first motion vector predictor list, and motion compensation unit 316 may determine a first triangular prediction block based on the first index value. For example, motion compensation unit 316 may determine a first motion vector information in the first motion vector predictor list based on the first index value, determine a first motion vector based on the first motion vector information, and determine the first triangular prediction block based on the first motion vector.

Entropy decoding unit 302 may decode a second value for determining a second index value in the first motion vector predictor list. In this example, motion compensation unit 316 may compare the second value to the first value. Based on the second value being greater than or equal to the first value, motion compensation unit 316 may add an offset (e.g., 1) to the second value to determine the second index value.

Motion compensation unit 316 may determine a second triangular prediction block based on the second index value. For example, motion compensation unit 316 may determine a second motion vector information in the first motion vector predictor list based on the second index value, determine a second motion vector based on the second motion vector information, and determine the second triangular prediction block based on the second motion vector.

In the above example, entropy decoding unit 302 may decode the first value based on a first range for the first value (e.g., 0-4) and decode the second value based on a second range for the second value (e.g., 0-3). The second range may be smaller than the first range.

As described in more detail, reconstruction unit 310 may reconstruct the current block based on the first triangular prediction block and the second triangular prediction block. For example, reconstruction unit 310 may add the first triangular prediction block to a first residual information to reconstruct a first triangle partition of the current block and add the second triangular prediction block to a second residual information to reconstruct a second triangle partition of the current block.

In some examples, motion compensation unit 316 may construct a second motion vector predictor list that includes motion vector information of one or more neighboring blocks of a second current block. Entropy decoding unit 302 may decode a third value for determining a third index value in the second motion vector predictor list. Motion compensation unit 316 may determine a third triangular prediction block based on the third index value.

Entropy decoding unit 302 may decode a fourth value for determining a fourth index value in the second motion vector predictor list. In this example, motion compensation unit 316 may compare the fourth value to the third value. Based on the fourth value being less than the third value, motion compensation unit 316 may set the fourth index value equal to the fourth value. Motion compensation unit 316 may determine a fourth triangular prediction block based on the fourth index value, and reconstruction unit 310 may reconstruct the second current block based on the third triangular prediction block and the fourth triangular prediction block.

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 7). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 118 of FIG. 1.

Figure 9:
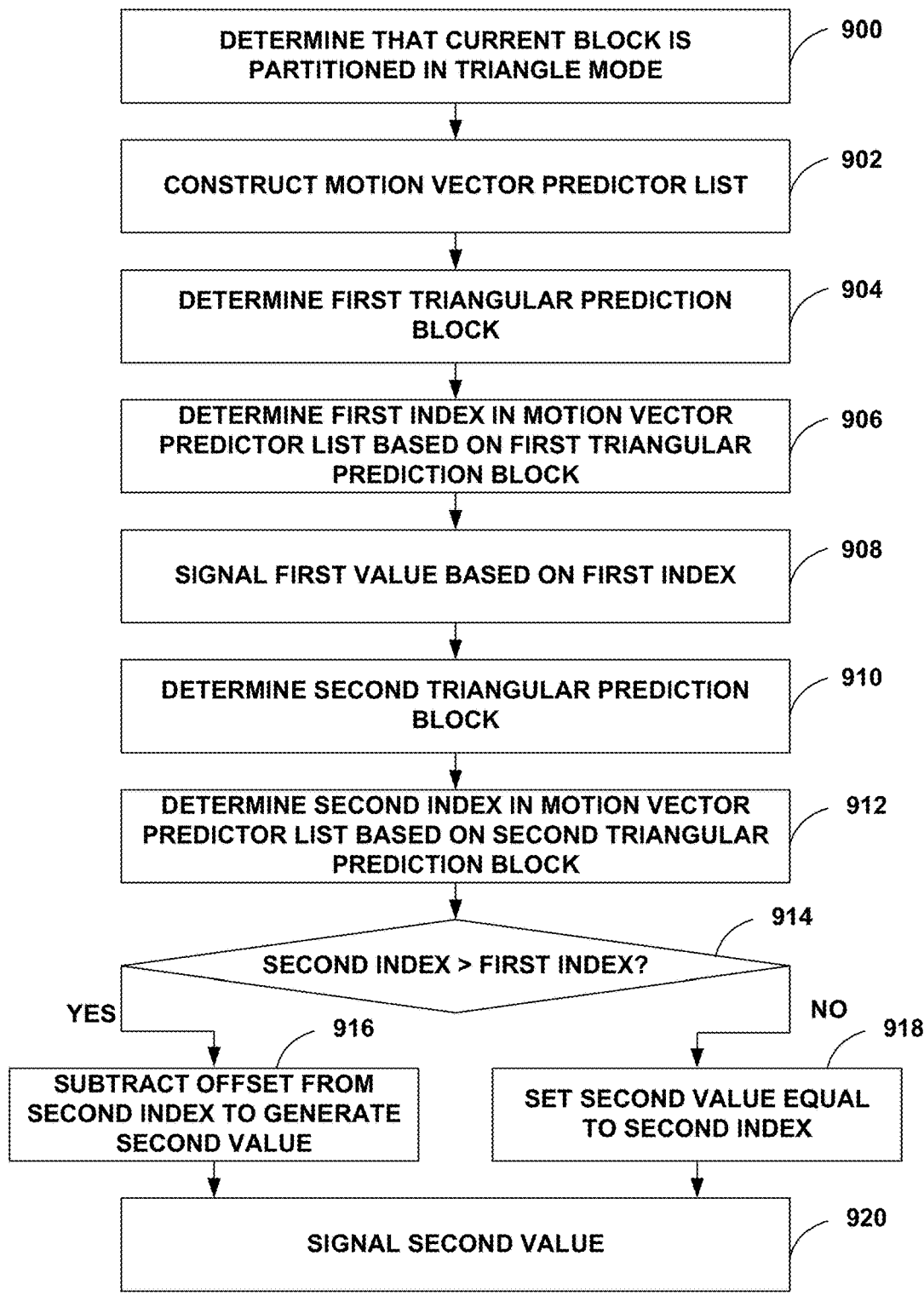
FIG. 9 is a flowchart illustrating an example method of encoding video data.

FIG. 9 is a flowchart illustrating an example method of encoding video data. The example techniques of FIG. 9 are described with respect to processing circuitry. One example of the processing circuitry is video encoder 200.

For example, the processing circuitry may determine that a current block is partitioned in triangle mode (900). In addition, the processing circuitry may construct a motion vector predictor list based on motion vector information of one or more neighboring blocks (902).

The processing circuitry may determine a first triangular prediction block (904). For example, the processing circuitry may determine a triangular prediction block that is closest to a first partition of the current block as the first triangular prediction block. The first triangular prediction block may be a block pointed to by a motion vector predictor in the motion vector predictor list, as one example. For instance, the processing circuitry may determine a first index value in the motion vector predictor list based on the first triangular prediction block (906). The processing circuitry may signal a first value based on the first index value (908). For example, the processing circuitry may set the first value equal to the first index value and signal the first value.

The processing circuitry may determine a second triangular prediction block (910). For example, the processing circuitry may determine a triangular prediction block that is closest to a second partition of the current block as the second triangular prediction block. The second triangular prediction block may be a block pointed to by a motion vector predictor in the motion vector predictor list, as one example. For instance, the processing circuitry may determine a second index value in the motion vector predictor list based on the second triangular prediction block (912).

In one or more examples, the processing circuitry may determine whether the second index value is greater than the first index value (914). Based on the second index value being greater than the first index value (YES of 914), the processing circuitry may subtract an offset from the second index value to generate a second value (916). Based on the second index value not being greater than the first index value (NO of 914), the processing circuitry may set a second value equal to the second index value (918). The processing circuitry may signal the second value (920).

Figure 10:
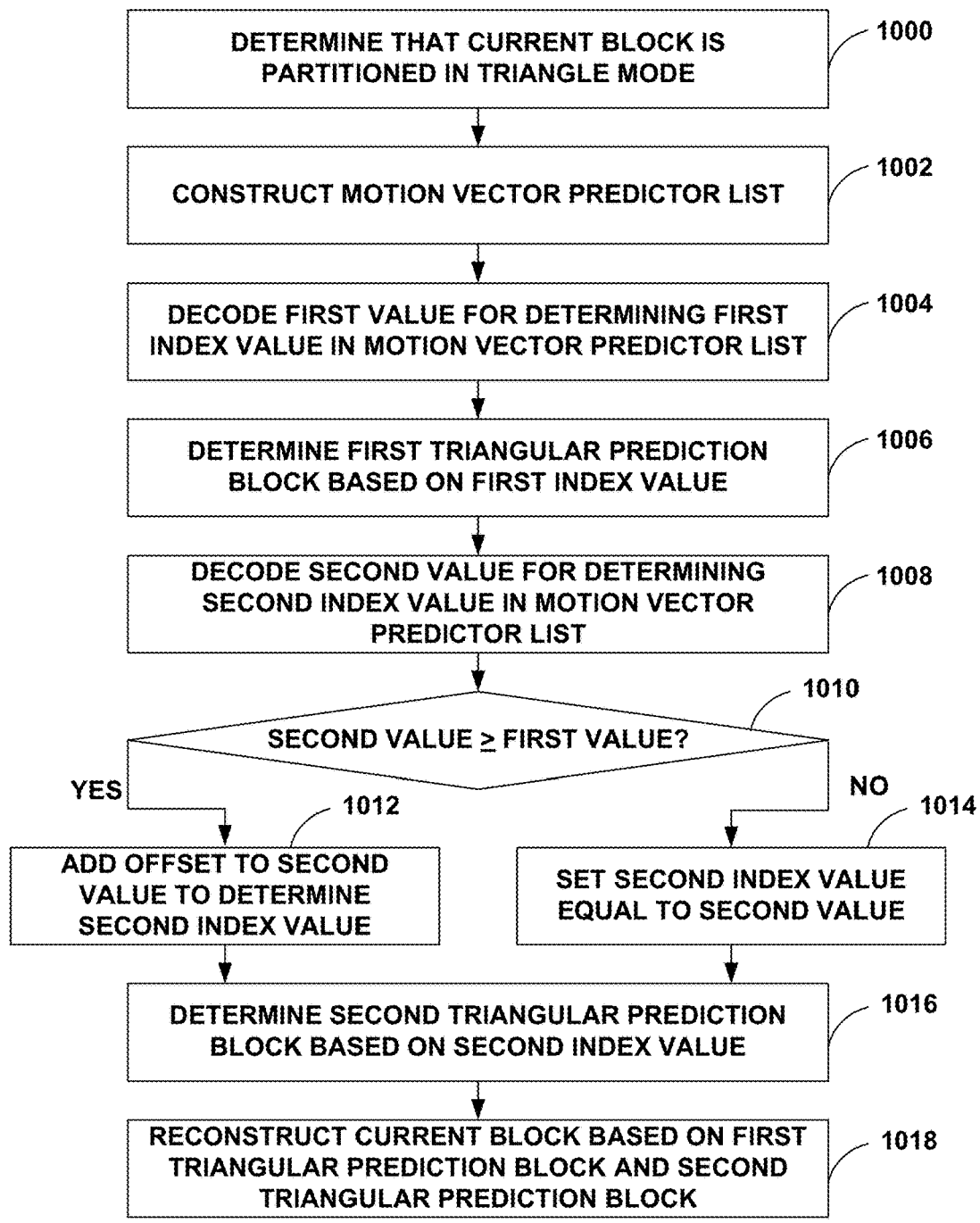
FIG. 10 is a flowchart illustrating an example method of decoding video data.

FIG. 10 is a flowchart illustrating an example method of decoding video data. The example techniques of FIG. 10 are described with respect to processing circuitry. One example of the processing circuitry is video decoder 300.

For example, the processing circuitry may determine that a current block is partitioned in triangle mode (1000). In addition, the processing circuitry may construct a motion vector predictor list based on motion vector information of one or more neighboring blocks (1002).

The processing circuitry may decode a first value for determining a first index value in the motion vector predictor list (1004) and may determine a first triangular prediction block based on the first index value (1006). For example, the processing circuitry may determine a first motion vector information in the motion vector predictor list based on the first index value, determine a first motion vector based on the first motion vector information, and determine the first triangular prediction block based on the first motion vector.

The processing circuitry may decode a second value for determining a second index value in the motion vector predictor list (1008). The processing circuitry may compare the second value to the first value (1010). Based on the second value being greater than or equal to the first value (YES of 1010), the processing circuitry may add an offset (e.g., 1) to the second value to determine the second index value (1012). Based on the second value not being greater than or equal to the first value (NO of 1010), the processing circuitry may set the second index value equal to the second value (1014).

The processing circuitry may determine a second triangular prediction block based on the second index value (1016). For example, the processing circuitry may determine a second motion vector information in the motion vector predictor list based on the second index value, determine a second motion vector based on the second motion vector information, and determine the second triangular prediction block based on the second motion vector.

The processing circuitry may reconstruct the current block based on the first triangular prediction block and the second triangular prediction block (1018). For example, the processing circuitry may receive first residual information for a first triangle partition of the current block and may add the first residual information to the first triangular prediction block to reconstruct the first triangle partition of the current block. The processing circuitry may receive second residual information for a second triangle partition and may add the second residual information to the second triangular prediction block to reconstruct the second triangle partition of the current block.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include one or more of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    determining that a current block is partitioned in a triangle mode;
    constructing a motion vector predictor list that includes motion vector information of one or more neighboring blocks of the current block;
    decoding a first value for determining a first index value in the motion vector predictor list;
    determining a first triangular prediction block based on the first index value;
    decoding a second value for determining a second index value in the motion vector predictor list;
    determining the second index value based on the second value, wherein determining the second index value comprises, based on the second value being greater than or equal to the first value, adding an offset to the second value to determine the second index value;
    determining a second triangular prediction block based on the second index value; and
    reconstructing the current block based on the first triangular prediction block and the second triangular prediction block.

2. The method of claim 1, wherein the offset is one.

3. The method of claim 1, further comprising:
    determining a partition direction for the current block based on a syntax element received separately from the first value and the second value.

4. The method of claim 1, wherein the current block comprises a first current block, and wherein the motion vector predictor list comprises a first motion vector predictor list, the method further comprising:
    constructing a second motion vector predictor list that includes motion vector information of one or more neighboring blocks of a second current block;
    decoding a third value for determining a third index value in the second motion vector predictor list;
    determining a third triangular prediction block based on the third index value;
    decoding a fourth value for determining a fourth index value in the second motion vector predictor list;
    determining the fourth index value based on the fourth value, wherein determining the fourth index value comprises, based on the fourth value being less than the third value, setting the fourth index value equal to the fourth value;
    determining a fourth triangular prediction block based on the fourth index value; and
    reconstructing the second current block based on the third triangular prediction block and the fourth triangular prediction block.

5. The method of claim 1, wherein decoding the first value comprises decoding the first value based on a first range for the first value, wherein decoding the second value comprises decoding the second value based on a second range for the second value, and wherein the second range is smaller than the first range.

6. The method of claim 1, wherein constructing the motion vector predictor list comprises:
    constructing an initial motion vector predictor list that includes both bi-prediction and uni-prediction motion vectors; and
    constructing the motion vector predictor list based on the initial motion vector predictor list.

7. The method of claim 1, wherein constructing the motion vector predictor list comprises constructing the motion vector predictor list for the current block coded in one of merge mode, advanced motion vector prediction (AMVP) mode, or affine mode.

8. The method of claim 1,
    wherein determining the first triangular prediction block based on the first index value comprises:
        determining first motion vector information in the motion vector predictor list based on the first index value;
        determining a first motion vector based on the first motion vector information; and
        determining the first triangular prediction block based on the first motion vector,
    wherein determining the second triangular prediction block based on the second index value comprises:
        determining second motion vector information in the motion vector predictor list based on the second index value;
        determining a second motion vector based on the second motion vector information; and
        determining the second triangular prediction block based on the second motion vector.

9. A device for decoding video data, the device comprising:
    memory configured to store a motion vector predictor list that includes motion vector information of one or more neighboring blocks of a current block; and
    processing circuitry configured to:
        determine that the current block is partitioned in a triangle mode;
        construct the motion vector predictor list, for storage in the memory, that includes the motion vector information of the one or more neighboring blocks of the current block;
        decode a first value for determining a first index value in the motion vector predictor list;
        determine a first triangular prediction block based on the first index value;
        decode a second value for determining a second index value in the motion vector predictor list;
        determine the second index value based on the second value, wherein to determine the second index value, the processing circuitry is configured to, based on the second value being greater than or equal to the first value, add an offset to the second value to determine the second index value;
        determine a second triangular prediction block based on the second index value; and
        reconstruct the current block based on the first triangular prediction block and the second triangular prediction block.

10. The device of claim 9, wherein the offset is one.

11. The device of claim 9, wherein the processing circuitry is configured to:
    determine a partition direction for the current block based on a syntax element received separately the first value and the second value.

12. The device of claim 9, wherein the current block comprises a first current block, wherein the motion vector predictor list comprises a first motion vector predictor list, and wherein the processing circuitry is configured to:
    construct a second motion vector predictor list that includes motion vector information of one or more neighboring blocks of a second current block;
    decode a third value for determining a third index value in the second motion vector predictor list;

determine a third triangular prediction block based on the third index value;

decode a fourth value for determining a fourth index value in the second motion vector predictor list;

determine the fourth index value based on the fourth value, wherein to determine the fourth index value, the processing circuitry is configured to, based on the fourth value being less than the third value, set the fourth index value equal to the fourth value;

determine a fourth triangular prediction block based on the fourth index value; and reconstruct the second current block based on the third triangular prediction block and the fourth triangular prediction block.

13. The device of claim 9, wherein to decode the first value, the processing circuitry is configured to decode the first value based on a first range for the first value, wherein to decode the second value, the processing circuitry is configured to decode the second value based on a second range for the second value, and wherein the second range is smaller than the first range.

14. The device of claim 9, wherein to construct the motion vector predictor list, the processing circuitry is configured to:
    construct an initial motion vector predictor list that includes both bi-prediction and uni-prediction motion vectors; and
    construct the motion vector predictor list based on the initial motion vector predictor list.

15. The device of claim 9, wherein to construct the motion vector predictor list, the processing circuitry is configured to construct the motion vector predictor list for the current block coded in one of merge mode, advanced motion vector prediction (AMVP) mode, or affine mode.

16. The device of claim 9,
    wherein to determine the first triangular prediction block based on the first index value, the processing circuitry is configured to:
        determine first motion vector information in the motion vector predictor list based on the first index value;
        determine a first motion vector based on the first motion vector information; and
        determine the first triangular prediction block based on the first motion vector,
    wherein to determine the second triangular prediction block based on the second index value, the processing circuitry is configured to:
        determine second motion vector information in the motion vector predictor list based on the second index value;
        determine a second motion vector based on the second motion vector information; and
        determine the second triangular prediction block based on the second motion vector.

17. The device of claim 9, wherein the device comprises a wireless communication device.

18. A method of encoding video data, the method comprising:
    determining that a current block is partitioned in a triangle mode;
    constructing a motion vector predictor list that includes motion vector information of one or more neighboring blocks of the current block;
    determining a first triangular prediction block;
    determining a first index value in the motion vector predictor list based on the determined first triangular prediction block;
    signaling a first value based on the first index value;
    determining a second triangular prediction block;
    determining a second index value in the motion vector predictor list based on the determined second triangular prediction block; and
    signaling a second value based on the second index value, wherein signaling the second value comprises, based on the second index value being greater than the first index value, subtracting an offset from the second index value to generate the second value.

19. The method of claim 18, wherein the offset is one.

20. The method of claim 18, further comprising:
    signaling a partition direction for the current block based on a syntax element separate from the first value and the second value.

21. The method of claim 18, wherein the current block comprises a first current block, and wherein the motion vector predictor list comprises a first motion vector predictor list, the method further comprising:
    constructing a second motion vector predictor list that includes motion vector information of one or more neighboring blocks of a second current block;
    determining a third triangular prediction block;
    determining a third index value in the second motion vector predictor list based on the determined third triangular prediction block;
    signaling a third value based on the third index value;
    determining a fourth triangular prediction block;
    determining a fourth index value in the second motion vector predictor list based on the determined fourth triangular prediction block; and
    signaling a fourth value based on the fourth index value, wherein signaling the fourth value comprises, based on the fourth index value being less than the third index value, signaling the fourth value as the fourth index value.

22. A device for encoding video data, the device comprising:
    memory configured to store a motion vector predictor list that includes motion vector information of one or more neighboring blocks of a current block; and
    processing circuitry configured to:
        determine that the current block is partitioned in a triangle mode;
        construct the motion vector predictor list, for storage in the memory, that includes the motion vector information of the one or more neighboring blocks of the current block;
        determine a first triangular prediction block;
        determine a first index value in the motion vector predictor list based on the determined first triangular prediction block;
        signal a first value based on the first index value;
        determine a second triangular prediction block;
        determine a second index value in the motion vector predictor list based on the determined second triangular prediction block; and
        signal a second value based on the second index value, wherein to signal the second value, the processing circuitry is configured to, based on the second index value being greater than the first index value, subtract an offset from the second index value to generate the second value.

23. The device of claim 22, wherein the offset is one.

24. The device of claim 22, wherein the processing circuitry is configured to:

signal a partition direction for the current block based on a syntax element, separate from the first value and the second value.

25. The device of claim 22, wherein the current block comprises a first current block, wherein the motion vector predictor list comprises a first motion vector predictor list, and wherein the processing circuitry is configured to:
  construct a second motion vector predictor list that includes motion vector information of one or more neighboring blocks of a second current block;
  determine a third triangular prediction block;
  determine a third index value in the second motion vector predictor list based on the determined third triangular prediction block;
  signal a third value based on the third index value;
  determine a fourth triangular prediction block;
  determine a fourth index value in the second motion vector predictor list based on the determined fourth triangular prediction block; and
  signal a fourth value based on the fourth index value, wherein to signal the fourth value, the processing circuitry is configured to, based on the fourth index value being less than the third index value, signal the fourth value as the fourth index value.

* * * * *